US009911228B2

(12) United States Patent
Pershing et al.

(10) Patent No.: US 9,911,228 B2
(45) Date of Patent: Mar. 6, 2018

(54) GEOMETRIC CORRECTION OF ROUGH WIREFRAME MODELS DERIVED FROM PHOTOGRAPHS

(75) Inventors: Chris Pershing, Redmond, WA (US); John F. Keane, Kenmore, WA (US)

(73) Assignee: Eagle View Technologies, Inc., Bothell, WA (US)

(*) Notice: Subject to any disclaimer, the term of this patent is extended or adjusted under 35 U.S.C. 154(b) by 1405 days.

(21) Appl. No.: 13/019,228

(22) Filed: Feb. 1, 2011

(65) Prior Publication Data

US 2011/0187713 A1 Aug. 4, 2011

Related U.S. Application Data

(60) Provisional application No. 61/300,414, filed on Feb. 1, 2010.

(51) Int. Cl.
*G06T 17/20* (2006.01)
*G06T 17/00* (2006.01)
*G06T 19/20* (2011.01)

(52) U.S. Cl.
CPC .............. *G06T 17/20* (2013.01); *G06T 19/20* (2013.01); *G06T 2210/04* (2013.01)

(58) Field of Classification Search
None
See application file for complete search history.

(56) References Cited

U.S. PATENT DOCUMENTS

| | | |
|---|---|---|
| 2,791,151 A | 5/1957 | Pennington |
| 3,617,016 A | 11/1971 | Bolsey |
| 5,247,356 A | 9/1993 | Ciampa .......................... 358/109 |
| 5,379,105 A | 1/1995 | Iki et al. |
| 5,596,494 A | 1/1997 | Kuo |
| 5,633,946 A | 5/1997 | Lachinski et al. |
| 5,633,995 A * | 5/1997 | McClain ................. G06T 15/10 345/419 |

(Continued)

FOREIGN PATENT DOCUMENTS

| | | |
|---|---|---|
| AU | 742146 B2 | 12/2000 |
| AU | 2008230031 B8 | 11/2009 |

(Continued)

OTHER PUBLICATIONS

U.S. Appl. No. 60/425,275, filed Nov. 8, 2002, 32 pp.

(Continued)

*Primary Examiner* — Tize Ma
(74) *Attorney, Agent, or Firm* — Dunlap Codding, P.C.

(57) ABSTRACT

Geometric correction of rough wireframe models derived from photographs may include rectification of either a 2D or 3D original wireframe model of a roof structure, derivation of metadata from the original wireframe, in-plane normalization of the wireframe, extrusion into a "rough" 3D wireframe based on the normalized wireframe, and correction of the "rough" 3D wireframe. The correction and normalization may be an iterative process based on initial pitch values, metadata derived from the original or corrected wireframe models and defined constraints regarding relationships between roof portions or segments. The iterative process may repeat adjusting the wireframe model until the adjusting converges to a stable state according to the various defined constraints.

9 Claims, 11 Drawing Sheets

(56) References Cited

U.S. PATENT DOCUMENTS

| | | | |
|---|---|---|---|
| 5,936,628 A | 8/1999 | Kitamura et al. | |
| 5,983,010 A | 11/1999 | Murdock et al. | |
| 6,246,412 B1 * | 6/2001 | Shum | G06T 15/10 345/419 |
| 6,323,885 B1 | 11/2001 | Wiese | 345/835 |
| 6,333,749 B1 | 12/2001 | Reinhardt et al. | |
| 6,385,541 B1 | 5/2002 | Blumberg et al. | 701/213 |
| 6,396,491 B2 | 5/2002 | Watanabe et al. | 345/419 |
| 6,446,053 B1 | 9/2002 | Elliott | 705/400 |
| 6,448,964 B1 | 9/2002 | Isaacs et al. | |
| 6,496,184 B1 | 12/2002 | Freeman et al. | 345/419 |
| 6,636,803 B1 | 10/2003 | Hartz, Jr. et al. | 701/208 |
| 6,741,757 B1 | 5/2004 | Torr et al. | |
| 6,760,117 B2 | 7/2004 | Slatter | |
| 6,836,270 B2 | 12/2004 | Du | 345/419 |
| 6,980,690 B1 | 12/2005 | Taylor et al. | 382/154 |
| 7,003,400 B2 | 2/2006 | Bryant | 702/5 |
| 7,006,977 B1 | 2/2006 | Attra et al. | 705/1 |
| 7,133,551 B2 * | 11/2006 | Chen et al. | 382/154 |
| 7,233,691 B2 | 6/2007 | Setterholm | |
| 7,305,983 B1 | 12/2007 | Meder et al. | 126/621 |
| 7,324,666 B2 | 1/2008 | Zoken et al. | 382/113 |
| 7,327,880 B2 | 2/2008 | Tek | |
| 7,333,963 B2 | 2/2008 | Widrow et al. | |
| 7,343,268 B2 | 3/2008 | Kishikawa | 703/1 |
| 7,373,303 B2 | 5/2008 | Moore et al. | |
| 7,376,284 B2 | 5/2008 | Tao et al. | |
| 7,424,133 B2 | 9/2008 | Schultz et al. | 382/106 |
| 7,428,337 B2 | 9/2008 | Gao et al. | |
| 7,460,214 B2 | 12/2008 | Schiavi | |
| 7,487,114 B2 | 2/2009 | Florance et al. | |
| 7,500,391 B2 | 3/2009 | Woro | |
| 7,509,241 B2 | 3/2009 | Guo et al. | |
| 7,519,206 B2 | 4/2009 | Mulet-Parada et al. | |
| 7,583,275 B2 | 9/2009 | Neumann et al. | |
| 7,629,985 B2 | 12/2009 | McArdle et al. | |
| 7,639,842 B2 | 12/2009 | Kelle et al. | |
| 7,728,833 B2 * | 6/2010 | Verma et al. | 345/420 |
| 7,752,018 B2 | 7/2010 | Rahmes et al. | |
| 7,787,659 B2 | 8/2010 | Schultz et al. | 382/106 |
| 7,844,499 B2 | 11/2010 | Yahiro et al. | |
| 7,869,944 B2 | 1/2011 | Deaton et al. | |
| 7,873,238 B2 | 1/2011 | Schultz et al. | 382/284 |
| 7,920,963 B2 | 4/2011 | Jouline et al. | |
| 7,950,579 B2 | 5/2011 | Gray et al. | |
| 7,991,226 B2 | 8/2011 | Schultz et al. | 382/167 |
| 7,995,799 B2 | 8/2011 | Schultz et al. | 382/106 |
| 7,995,862 B2 | 8/2011 | Tao et al. | |
| 8,051,089 B2 | 11/2011 | Gargi et al. | |
| 8,068,643 B2 | 11/2011 | Schultz et al. | |
| 8,078,436 B2 | 12/2011 | Pershing et al. | 703/2 |
| 8,081,798 B2 | 12/2011 | Paglieroni et al. | |
| 8,081,841 B2 | 12/2011 | Schultz et al. | 382/284 |
| 8,131,514 B2 | 3/2012 | Royan et al. | |
| 8,145,578 B2 | 3/2012 | Pershing et al. | |
| 8,170,840 B2 | 5/2012 | Pershing | |
| 8,204,341 B2 | 6/2012 | Schultz et al. | |
| 8,209,152 B2 | 6/2012 | Pershing | |
| 8,233,666 B2 | 7/2012 | Schultz et al. | |
| 8,385,672 B2 | 2/2013 | Giuffrida et al. | |
| 8,401,222 B2 | 3/2013 | Thornberry et al. | |
| 8,417,061 B2 | 4/2013 | Kennedy et al. | |
| 8,437,554 B2 | 5/2013 | Kim et al. | |
| 8,471,854 B2 | 6/2013 | Kelley et al. | |
| 8,477,190 B2 | 7/2013 | Giuffrida et al. | |
| 8,520,079 B2 | 8/2013 | Schultz et al. | |
| 8,531,472 B2 | 9/2013 | Freund et al. | |
| 8,538,151 B2 | 9/2013 | Shimamura et al. | |
| 8,538,918 B1 | 9/2013 | Pearcy et al. | |
| 8,588,547 B2 | 11/2013 | Giuffrida et al. | |
| 8,593,518 B2 | 11/2013 | Schultz et al. | |
| 8,624,920 B2 | 1/2014 | Fujinaga | |
| 8,670,961 B2 | 3/2014 | Pershing et al. | |
| 8,818,770 B2 | 8/2014 | Pershing | |
| 8,825,454 B2 | 9/2014 | Pershing | |
| 9,129,376 B2 | 9/2015 | Pershing | |
| 9,135,737 B2 | 9/2015 | Pershing | |
| 2002/0010594 A1 | 1/2002 | Levine | |
| 2002/0101594 A1 | 8/2002 | Slatter | |
| 2002/0143669 A1 | 10/2002 | Scheer | |
| 2002/0154174 A1 | 10/2002 | Redlich et al. | 345/848 |
| 2003/0014224 A1 | 1/2003 | Guo et al. | 703/1 |
| 2003/0028393 A1 | 2/2003 | Coulston et al. | 705/1 |
| 2003/0103651 A1 | 6/2003 | Novak | |
| 2003/0115163 A1 | 6/2003 | Moore et al. | 705/500 |
| 2003/0171957 A1 | 9/2003 | Watrous | 705/4 |
| 2003/0233310 A1 | 12/2003 | Stavrovski | 705/37 |
| 2004/0047498 A1 | 3/2004 | Mulet-Parada et al. | 382/128 |
| 2004/0105090 A1 | 6/2004 | Schultz et al. | 356/141.5 |
| 2004/0105573 A1 | 6/2004 | Neumann et al. | 382/103 |
| 2004/0128313 A1 | 7/2004 | Whyman | |
| 2004/0220906 A1 | 11/2004 | Gargi et al. | 707/3 |
| 2005/0129306 A1 | 6/2005 | Wang et al. | |
| 2005/0203768 A1 | 9/2005 | Florance et al. | 705/1 |
| 2005/0267657 A1 | 12/2005 | Devdhar | |
| 2005/0288959 A1 | 12/2005 | Eraker et al. | 705/1 |
| 2006/0061566 A1 | 3/2006 | Verma et al. | |
| 2006/0137736 A1 | 6/2006 | Nishitani et al. | |
| 2006/0169775 A1 | 8/2006 | Gray et al. | |
| 2006/0200311 A1 | 9/2006 | Arutunian et al. | 701/210 |
| 2006/0232605 A1 | 10/2006 | Imamura | 345/619 |
| 2006/0235611 A1 | 10/2006 | Deaton et al. | |
| 2006/0262112 A1 | 11/2006 | Shimada | 345/419 |
| 2006/0265287 A1 | 11/2006 | Kubo | 705/26 |
| 2007/0058850 A1 | 3/2007 | Luo et al. | |
| 2007/0081714 A1 | 4/2007 | Wallack et al. | |
| 2007/0150366 A1 | 6/2007 | Yahiro et al. | 705/26 |
| 2007/0179757 A1 | 8/2007 | Simpson | 703/1 |
| 2007/0220174 A1 | 9/2007 | Abhyanker | |
| 2008/0021683 A1 * | 1/2008 | Rahmes et al. | 703/7 |
| 2008/0089610 A1 | 4/2008 | Tao et al. | |
| 2008/0105045 A1 | 5/2008 | Woro | 73/170.27 |
| 2008/0123994 A1 | 5/2008 | Schultz et al. | 382/284 |
| 2008/0162380 A1 | 7/2008 | Suga et al. | |
| 2008/0204570 A1 | 8/2008 | Schultz et al. | 348/222.1 |
| 2008/0221843 A1 | 9/2008 | Shenkar et al. | 703/1 |
| 2008/0231700 A1 | 9/2008 | Schultz et al. | 348/144 |
| 2008/0262789 A1 | 10/2008 | Pershing et al. | 702/156 |
| 2008/0273753 A1 | 11/2008 | Giuffrida et al. | 382/103 |
| 2008/0310756 A1 | 12/2008 | Tao et al. | 382/285 |
| 2009/0046759 A1 | 2/2009 | Lee et al. | |
| 2009/0085915 A1 * | 4/2009 | Kelley et al. | 345/427 |
| 2009/0096884 A1 | 4/2009 | Schultz et al. | 348/222.1 |
| 2009/0097744 A1 | 4/2009 | Schultz et al. | 382/167 |
| 2009/0132210 A1 | 5/2009 | Royan et al. | 703/1 |
| 2009/0132436 A1 * | 5/2009 | Pershing et al. | 705/400 |
| 2009/0141020 A1 | 6/2009 | Freund et al. | 345/419 |
| 2009/0216552 A1 | 8/2009 | Watrous | |
| 2009/0225026 A1 | 9/2009 | Sheba | |
| 2009/0304227 A1 | 12/2009 | Kennedy et al. | 382/100 |
| 2010/0034483 A1 | 2/2010 | Giuffrida et al. | 382/284 |
| 2010/0110074 A1 | 5/2010 | Pershing | 345/423 |
| 2010/0114537 A1 | 5/2010 | Pershing | 703/1 |
| 2010/0179787 A2 | 7/2010 | Pershing et al. | |
| 2010/0241406 A1 | 9/2010 | Rahmes et al. | |
| 2010/0296693 A1 | 11/2010 | Thornberry et al. | 382/100 |
| 2010/0302243 A1 | 12/2010 | Schultz et al. | 345/423 |
| 2011/0086201 A1 | 4/2011 | Shiao et al. | |
| 2011/0091075 A1 | 4/2011 | Schultz et al. | 382/106 |
| 2011/0091076 A1 | 4/2011 | Schultz et al. | 382/106 |
| 2011/0096083 A1 | 4/2011 | Schultz | 345/583 |
| 2011/0102461 A1 | 5/2011 | Schultz et al. | |
| 2011/0205245 A1 | 8/2011 | Kennedy et al. | |
| 2011/0216962 A1 | 9/2011 | Kim et al. | |
| 2012/0007982 A1 | 1/2012 | Giuffrida et al. | 348/144 |
| 2012/0035887 A1 | 2/2012 | Augenbraun et al. | |
| 2012/0066187 A1 | 3/2012 | Pearcy et al. | |
| 2012/0170797 A1 | 7/2012 | Pershing et al. | |
| 2012/0191424 A1 | 7/2012 | Pershing | |
| 2012/0209782 A1 | 8/2012 | Pershing et al. | |
| 2012/0223965 A1 | 9/2012 | Pershing | |
| 2012/0224770 A1 | 9/2012 | Strassenburg-Kleciak | |
| 2013/0202157 A1 | 8/2013 | Pershing | |
| 2013/0204575 A1 | 8/2013 | Pershing | |

(56) References Cited

U.S. PATENT DOCUMENTS

| | | | |
|---|---|---|---|
| 2013/0216089 | A1 | 8/2013 | Chen et al. |
| 2013/0226515 | A1 | 8/2013 | Pershing et al. |
| 2013/0262029 | A1 | 10/2013 | Pershing |
| 2013/0311240 | A1 | 11/2013 | Pershing et al. |
| 2013/0346020 | A1 | 12/2013 | Pershing |
| 2014/0046627 | A1 | 2/2014 | Pershing |
| 2014/0177945 | A1 | 6/2014 | Pershing et al. |
| 2014/0279593 | A1 | 9/2014 | Pershing |
| 2015/0015605 | A1 | 1/2015 | Pershing |
| 2015/0016689 | A1 | 1/2015 | Pershing |
| 2015/0370928 | A1 | 12/2015 | Pershing |
| 2015/0370929 | A1 | 12/2015 | Pershing |

FOREIGN PATENT DOCUMENTS

| | | |
|---|---|---|
| CA | 2191954 A1 | 12/1995 |
| CN | 102194120 A | 9/2011 |
| DE | 198 57 667 A1 | 8/2000 |
| EP | 1 010 966 B1 | 10/2002 |
| EP | 1 619 610 A1 | 1/2006 |
| EP | 2 251 833 A2 | 11/2010 |
| WO | WO 00/29806 | 5/2000 |
| WO | WO 2005/124276 A2 | 12/2005 |
| WO | WO 2006/040775 A2 | 4/2006 |
| WO | WO 2006/090132 A2 | 8/2006 |
| WO | 2009/046459 A1 | 4/2009 |
| WO | WO 2011/094760 A2 | 8/2011 |

OTHER PUBLICATIONS

YouTube, "Pictometry Online Demo," DVD, Feb. 25, 2010.
www.archive.org Web site showing alleged archive of German AeroDach Web Site http://www.aerodach.de from Jun. 13, 2004 (retrieved Sep. 20, 2012) and translations to English, 21 pages.
www.archive.org Web site showing alleged archive of German Aerowest Web site http://aerowest.de/ from Feb. 6, 2006 (retrieved Sep. 20, 2012) and translated to English, 61 pages.
"AeroDach® Online Roof Evaluation Standard Delivery Format and 3D Data File" Document Version 01.00.2002 with alleged publication in 2002, 21 pages.
Noronha et al., "Detection and Modeling of Buildings from Multiple Aerial Images," Institute for Robotics and Intelligent Systems, University of Southern California, Nov. 27, 2001, 33 pages.
Canadian Office Action, for Canadian Application No. 2,641,373, dated Jan. 9, 2012, 4 pages.
Notice of Allowance, for U.S. Appl. No. 12/148,439, mailed Feb. 3, 2012, 35 pages.
Notice of Allowance, for U.S. Appl. No. 12/467,244, mailed Feb. 16, 2012, 20 pages.
Notice of Allowance for U.S. Appl. No. 12/467,250, mailed Feb. 16, 2012, 19 pages.
Pictometry, "Frequently Asked Questions," retrieved Feb. 10, 2012, from http://www.web.archive.org/web/20061223085009/http://pictometry.com/faq.asp, 6 pages.
"AeroDach® Online Dachauswertung: Standardlieferformat und 3D-Datensatz," Aerowest GMBH,Version 01.00.2002, 6 pages.
"Aerodach® Online Roof Analysis: Standard Delivery Format and 3D Dataset," AEROWESTGmbH, Version as of 00-01-2002, 6 pages.
"AppliCad Software and EagleView® Technologies Partner for Metal Roofing Contractors," EagleView Technolgies and AppliCad Software, retrieved from blog.eagleview.com/?=614 on Feb. 1, 2012, 2 pages.
"Definitions of Surveying and Associated Terms," American Congress on Surveying and Mapping, reprinted 1989, p. 3, 2 pages.
"Glossary of the Mapping Sciences," American Society of Civil Engineering, ASCE Publications, 1994, pp. 9-10, 3 pages.
"Microsoft's MSN Virtual Earth: The Map is the Search Platform," Directions Magazine URL=http://www.directionsmag.com/article.php?article_id=873&trv=1, retrieved Feb. 6, 2009, 10 pages.

"Pictometry—In the News," URL=http://204.8.121.114/pressrelease%20archived/pressrelease_aec.asp, retrieved Feb. 6, 2009, 3 pages.
"Software; New Products," LexisNexis Roofing Contractor article 23(2):121(2), Jan. 3, 2006, 1 page.
"Sorcerer: Nobody builds roofs like this builds roofs," retrieved from URL=http://web.archive.org/web/2006021409237/http://www.applicad.com.au/product-features . . . on Mar. 29, 2012, 2 pages.
Aerodach, "Protokoll zur Dachauswertung," Oct. 19, 2010, 12 pages.
Aerowest GMBH, "AeroDach—das patentierte Dachaufmass," Jan. 1, 2006, retrieved from URL=http://web.archive.org/web/20060101021543/http://www.aerowest.de/aerodach.html on Mar. 25, 2012, 2 pages.
Aerowest GMBH, "Aerowest Pricelist of Geodata," Oct. 21, 2005, 2 pages.
Aerowest GMBH, "Geodata Service; AeroDach—Patented Roof Dimensions," Jan. 1, 2006, revtrieved from URL=http://web.archive.org/web/20060101021543/http://www.aerowest.de/aerodach.html, on Mar. 25, 2012, 2 pages.
Aerowest GMBH. "Preisliste Geodaten Aerowest," Oct. 21, 2005, 1 page.
Appli-cad Australia, "Linear Nesting Reports," AppliCad Sample Reports, Jul. 18, 2000, 9 pages.
Appli-cad Australia, "Roof Magician: Especially suited to single, shake and tile roofing," Sample Reports, Jun. 24, 2004, 13 pages.
Appli-cad Australia, "Roof Wizard: Advanced Software for Roof Modeiling and Estimating," Document Issue 1.0.0, Sep. 25, 2004, 10 pages.
Appli-cad Australia, "Roof Wizard: Especially suited to metal roofing," Generate Offcuts Reports, Mar. 9, 2005, 7 pages.
Appli-cad Australia, "Roof Wizard: Especially suited to metal roofing," Generate Offcuts Reports, Sep. 14, 2006, 7 pages.
Appli-cad Australia, "Roof Wizard: Especially suited to metal roofing," Sample Reports, Jul. 13, 2004, 24 pages.
Appli-cad Australia, "Roof Wizard: Especially suited to metal roofing," Sample Reports, Sep. 17, 2002, 12 pages.
Appli-cad Australia, "Sorcerer: Advanced Software for Roof Modeling and Estimating," Reference Guide Verision 3, Sep. 8, 1999, 142 pages.
Appli-cad Australia, "Sorcerer: The complete solution for professional roof estimating," Demonstration Kit, Mar. 9, 2005, 15 pages.
AppliCad Roofing, sample report dated Jul. 30, 2007, 1 page.
Applicad Roofing, sample report dated Mar. 2, 2005, 28 pages.
AppliCad USA, "Linear Nesting Reports," AppliCad Sample Reports, Nov. 25, 1999, 9 pages.
Applicad webpage 2005 snip different color lines, 1 page.
AppliCad, "Example Output and Brochures," retrieved from URL=http://www.applicad.com/au/product-reports.html on Apr. 16, 2012, 2 pages.
AppliCad, "Product Overview—Sorcerer: Advanced Software for Roofing Modeling, Estimating, Presentation and Installation," Issue 5, Mar. 2, 2001, 15 pages.
AppliCad, "Roofing Software: Product Bulletin Section 1—Modelling the Roof," Dec. 20, 2005, retrieved from URL=htpp://web.archive.org/web/20021122204408/http://www.applicad.com.au/ on Apr. 16, 2012, 3 pages.
AppliCad, "Roofing Software: Product Bulletin Section 1—Modelling the Roof," Jan. 7, 2002, retrieved from URL=htpp://web.archive.org/web/20021122204408/http://www.applicad.com.au/ on Apr. 16, 2012, 3 pages.
AppliCad, "Roofing Software: Product Bulletin Section 2—Modifying the Model," Dec. 20, 2005, retrived from URL=http://web.archive.org/web/20051210130430/http://www.applicad.com.au/ on Apr. 16, 2012, 2 pages.
AppliCad, "RoofScape: Advanced Software for Roof Modelling and Estimating," Learning Guide (English Units), Revision 1.1, Aug. 2007, 48 pages.
Ciarcia et al., "Automated Roof Identification Systems and Methods," U.S. Appl. No. 12/590,131, filed Nov. 2, 2009, 74 pages.

(56) References Cited

OTHER PUBLICATIONS

Ciarcia et al., "Automated Roof Identification Systems and Methods," U.S. Appl. No. 12/590,131, Notice of Allowance, mailed Aug. 26, 2013, 9 pages.
Ciarcia et al., "Automated Roof Identification Systems and Methods," Office Action mailed Jan. 9, 2013, for U.S. Appl. No. 12/590,131, 14 pages.
Ciarcia, "Systems and Methods for Point-To-Point Registration Using Perspective Imagery From Independent Sources Without Image Acquisition Metadata," U.S. Appl. No. 13/646,466, filed Oct. 5, 2012, 41 pages.
Drawing received Jan. 31, 2012.
Falkner et al., *Aerial Mapping 2nd Edition*, Lewis Publishers (CRC Press LLC), 2002, "Chapter 11—Aerotriangulation," 23 pages.
Fritsch, "Introduction into Digital Aerotriangulation," Photogrammetric Week '95, Wichman Verlag, Heidelberg, 1995, pp. 165-171, 7 pages.
Geospan Corporation, "Digital Geo-Referenced Oblique Aerial Imagery Solution EPP-REP No. 8444 5/13," GEO-NY0000868, 2007, 28 pages.
International Preliminary Report on Patentability for International Application No. PCT/US2011/023408, mailed Aug. 16, 2012, 7 pages.
International Search Report and Written Opinion for International Application No. PCT/US2013/023502, mailed Apr. 30, 2013, 8 pages.
Minialoff, "Introduction to Computer Aided Design," Apr. 2000, 4 pages.
Office Action received in Reexamination of U.S. Pat. No. 8,078,436 B2, Supplemental Reexamination Patent, mailed Jul. 25, 2013, 72 pages.
Office Action received in Reexamination of U.S. Pat. No. 8,145,578 B2, Supplemental Reexamination Patent, mailed Jul. 25, 2013, 24 pages.
Pershing et al., "Aerial Roof Estimation System and Method," Office Action mailed Oct. 10, 2012, for U.S. Appl. No. 13/371,271, 7 pages.
Pershing et al., "Aerial Roof Estimation System and Method," Notice of Allowance mailed Jul. 29, 2013, for U.S. Appl. No. 13/371,271, 15 pages.
Pershing et al., "Aerial Roof Estimation System and Method," U.S. Appl. No. 60/925,072, filed Apr. 17, 2007, 16 pages.
Pershing et al., "Aerial Roof Estimation System and Methods," Office Action mailed Aug. 28, 2012, for U.S. Appl. No. 13/287,954, 12 pages.
Pershing et al., "Aerial Roof Estimation System and Methods," Office Action mailed May 22, 2013, for U.S. Appl. No. 13/287,954, 25 pages.
Pershing et al., "Geometric Correction of Rough Wireframe Models Derived From Photographs," U.S. Appl. No. 61/300,414, filed Feb. 1, 2010, 22 pages.
Pershing, "Concurrnt Display Systems and Methods for Aerial Roof Estimation," Office Action mailed Aug. 28, 2012, for U.S. Appl. No. 13/474,504, 8 pages.
Pershing, "Concurrnt Display Systems and Methods for Aerial Roof Estimation," Office Action mailed Jun. 19, 2013, for U.S. Appl. No. 13/474,504, 14 pages.
Pershing, "Pitch Determination Systems and Methods for Aerial Roof Estimation," Office Action for U.S. Appl. No. 13/438,288, Aug. 24, 2012, 8 pages.
Pershing, "Pitch Determination Systems and Methods for Aerial Roof Estimation," Office Action mailed May 21, 2013, for U.S. Appl. No. 13/438,288, 11 pages.
Pershing, "Systems and Methods for Estimation of Building Floor Area," U.S. Appl. No. 13/385,607, filed Feb. 3, 2012, 41 pages.
Pershing, "Systems and Methods for Estimation of Building Floor Area," U.S. Appl. No. 13/757,712, filed Feb. 1, 2013, 95 pages.
Pershing, "Systems and Methods for Estimation of Building Wall Area," U.S. Appl. No. 13/757,694, filed Feb. 1, 2013, 96 pages.
Pershing, "User Interface Techniques for Roof Estimation," U.S. Appl. No. 61/197,904, filed Oct. 31, 2008, 62 pages.
Pictometry.com, "Frequently Asked Questions," May 24, 2005, retrieved Mar. 28, 2012, from URL=http://web.archive.org/web/20050524205653/http://pictometry.com/faq.asp, 9 pages.
Pictometry.com, "Frequently Asked Questions," retrieved on Aug. 1, 2005, from http://replay.waybackmachine.org/20050801231818/http:///www.pictometry.com/faq.asp, 10 pages.
Precigeo.com, "Welcome to precigeoRoof," URL=http://web.archive.org/web/20070106063144/roof.precigeo.com, retrieved Apr. 30, 2009, 1 page.
Precigeo.com, "Welcome to precigeo™," URL=http://web.archive.org/20080110074814/http://www.precigeo.com, retrieved Feb. 17, 2009, 1 page.
Precigo.com, "How precigeoRoof Works," URL=http://web.archive.org/web/20070107012311/roof.precigeo.com/how-precigeo-roof-works.htm, retrieved Apr. 30, 2009, 2 pages.
RoofCAD, "Satellite Takeoff Tutorial-Pitched Roof," received Jan. 31, 2012, 25 pages.
Sorcerer software screenshot, modified on Sep. 6, 2012, 1 page.
Wolf, *Elements of Photogrammetry*, McGraw-Hill Kogakusha, 1974, "Chapter Fourteen: Aerotriangulation; 41-1 Intorduction," pp. 351-352, 3 pages.
Australian Office Action for Australian Application No. 2010201839, dated Apr. 14, 2011, 2 pages.
Autodesk, "Autodesk ImageModeler—Features," retrieved on Sep. 30, 2008, from http://usa.autodesk.com/adsk/servlet/index?siteID=123112&id=115639 . . . , 1 page.
Automatic House Reconstruction, retrieved on Sep. 29, 2008, from http://www.vision.ee.ethz.ch/projects/Amobe_I/recons.html, 6 pages.
Baillard et al., "Automatic reconstruction of piecewise planar models from multiple views," CVPR99, vol. 2, 1999, pp. 559-565. (7 pages).
Bignone et al., "Automatic Extraction of Generic House Roofs from High Resolution Aerial Imagery," *Proc. ECCV*, 1996, 12 pages.
Chevrier et al., "Interactive 3D reconstruction for urban areas—An image based tool," *CAAD Futures*, 2001, 13 pages.
Debevec et al., "Modeling and Rendering Architecture from Photographs: A hybrid geometry- and image-based approach," *SIGGRAPH conference proceedings*, retrieved from www.cs.berkeley.edu/~malik/papers/debevecTM96.pdf., 1996, 10 pages.
Delaney, "Searching for Clients From Above—More Small Businesspeople Use Aerial Mapping Services to Scout Potential Customers," *The Wall Street Journal*, Jul. 31, 2007, retrieved on Feb. 25, 2010, from http://online.wsj.com/public/article/SB118584306224482891.html?mod=yahoo_free, 3 pages.
Faugeras et al., "3-D Reconstruction of Urban Scenes from Sequences of Images," Institut National De Recherche En Informatique Et En Automatique, No. 2572, Jun. 1995, 27 pages.
Gülch et al., "On the Performance of Semi-Automatic Building Extraction," In the International Archives of Photogrammetry and Remote Sensing, vol. 23, 8 pages, 1998.
Henricsson et al., "3-D Building Reconstruction with ARUBA: A Qualitative and Quantitative Evaluation," Institute of Geodesy and Photogrammetry, Swiss Federal Institute of Technology, 2001, 13 pages.
International Search Report for International Application No. PCT/US11/23408, mailed Aug. 11, 2011, 2 pages.
Lueders, "Infringement Allegations by EagleView Technologies," Feb. 10, 2009, 3 pages.
Mann, "Roof with a view," *Contract Journal* 431(6552):29, Nov. 23, 2005, 2 pages.
Miller et al., "Miller's Guide to Framing and Roofing," McGraw Hill, New York, pp. 131-1356and 162-163, 2005. (9 pages).
Noronha et al., "Detection and Modeling of Buildings from Multiple Aerial Images," *IEEE Transactions on Pattern Analysis and Machine Intelligence* 23(5):501-518, 2001. (32 pages).
Office Action, for U.S. Appl. No. 12/148,439, mailed Aug. 16, 2010, 47 pages.
Office Action, for U.S. Appl. No. 12/148,439, mailed Apr. 25, 2011, 52 pages.

(56) References Cited

OTHER PUBLICATIONS

Office Action, for U.S. Appl. No. 12/148,439, mailed Aug. 25, 2011, 77 pages.
Office Action, for U.S. Appl. No. 12/253,092, mailed May 10, 2011, 26 pages.
Office Action for U.S. Appl. No. 12/467,244, mailed Aug. 26, 2011, 17 pages.
Office Action for U.S. Appl. No. 12/467,250, mailed Sep. 7, 2011, 14 pages.
PhotoModeler, "Measuring & Modeling the Real World," retrieved Sep. 30, 2008, from http://www.photomodeler.com/products/photomodeler.htm, 2 pages.
Pictometry.com, "Frequently Asked Questions," retrieved on Apr. 9, 2011, from http://replay.waybackmachine.org/20050801231818/http://www.pictometry.com/faq.asp, 10 pages.
Pictometry.com. "Pictometry Announces Software and Web-based Solution for Engineers, Architects, and Planners," Press Releases, Jan. 22, 2004, 3 pages.
Pictometry, "Electronic Field Study™ Getting Started Guide," Version 2.7, Jul. 2007, 15 pages.
Pictometry, "FAQs," Sep. 22, 2008, retrieved on Aug. 10, 2011, from http://www.web.archive.org/web/20080922013233/http://www.pictometry.com/about_us/faqs.sht . . . , 3 pages.
Pictometry Online, "Government," Oct. 7, 2008, retrieved Aug. 10, 2011, from http://web.archive.org/web/20081007111115/http://www.pictometry.com/government/prod . . . , 3 pages.
Poullis et al., "Photogrammetric Modeling and Image-Based Rendering for Rapid Virtual Environment Creation," http://handle.dtic.mil/100.2/ADA433420, 1998, 7 pages.
Precigeo.com, "Welcome to precigeo™," "Welcome to precigeoRoof," "Why precigeoRoof," "How precigeoRoof Works," "How precigeoRoof Can Help Me," all retrieved on Feb. 26, 2010, from http://web.archive.org/, pp. 1-5; "Why precigeoRisk Works" and "Welcome to precigeoRisk," retrieved on Aug. 14, 2010, from http://web.archive.org, pp. 6-11. (11 pages total).
Scholze et al., "A Probabilistic Approach to Building Roof Reconstruction Using Semantic Labelling," *Pattern Recognition 2449/2002*, Springer Berlin/Heidelberg, 2002, 8 pages.
Schutzberg et al., "Microsoft's MSN Virtual Earth: The Map is the Search Platform," *Directions Magazine* retrieved Feb. 6, 2009, from http://www.directionsmag.com/article.php?article_id=873&trv=1, 10 pages.
Written Opinion, for International Application No. PCT/US11/23408, mailed Aug. 11, 2011, 5 pages.
YouTube, "Pictometry Online Demo," retrieved on Feb. 6, 2009, from http://www.youtube.com/watch?v=jURSK7o0OD0, 1 page.
Ziegler et al., "3D Reconstruction Using Labeled Image Regions," Mitsubishi Electric Research Laboratories, http://www.merl.com, Jun. 2003, 14 pages.
Notice of Allowance, for U.S. Appl. No. 12/253,092, mailed Oct. 14, 2011, 30 pages.
Transcription of points of potential interest in the attached Youtube video titled: "Pictometry Online Demo" retrieved Feb. 25, 2010. DVD originally cited in Information Disclosure Statement dated Sep. 15, 2011.
"3D Reconstruction," retrieved Oct. 25, 2013, from http://www8cs.umu.se/kurser-TDBD19/V705/reconstruct-4.pdf, 5 pages.
"8. Epipolar Geometry and the Fundamental Matrix," retrieved Oct. 25, 2013, from http://www.robtos.ox.ac.u1/~vgg/hzbook/hzbook1/HZepipolar.pdf, 25 pages.
"About the SPIE Digital Library," SPIE, retrieved from http://spiedigitallibrary.org/ss/about.aspx, retrieved on Sep. 7, 2016, 3 pages.
"Photo Tours Google," Web Search, retrieved Oct. 25, 2013, from http://www.google.com/search?q=photo+tours=google, 2 pages.
"Updating App Resources from server in iOS," Mar. 11, 2013, retrieved from http://stackoverflow.com/questions/15334155/updating-app-resources-from-server-in-ios, 2 pages.
Affidavit Attesting to the Accuracy of the Attached "Aerowest" Translation Under 37 C.F.R. §§ 42.2, 42.63(b), and/or 1.68, Mar. 18, 2013, 1 page.
Agarwal et al., "Reconstructing Rome," *IEEE Computer* 43(6): 40-47, Jun. 2010.
Agarwal et al., "Building Rome in a Day," *Communications of the ACM* 54(10): 105-112, Oct. 2011.
Agarwala et al., "Interactive Digital Photomontage," ACM SIGGRAPH 2004, Los Angeles, CA, Aug. 2004, 9 pages.
Agarwala et al., "Panoramic Video Textures," SIGGRAPH 2005, Los Angeles, CA, Aug. 2005, 8 pages.
Appli-cad, "World Class Technology Leading the Way in Roofing Software," Product Bulletin, 2002, 97 pages.
Appli-cad, "World Class Technology Leading the Way in Roofing Software," Product Bulletin, Nov. 2002, 46 pages.
ASPRS Bookstore—Manuals, "Digital Photogrammetry: An Addendum to the Manual of Photogrammetry, Greve, (ed.), 1996," retrieved from http://web.archive.org/web/19980116141702/http://www.asprs.org/asprs/publications/bookstore/mamanuals.html, retrieved on Oct. 3, 2016, 6 pages.
Atkinson, "Theory of Close Range Photogrammetry," Chapter 2, Section 1, Coordinate Transformations, retrieved Oct. 21, 2013, from http://www.lems.brown.edu/vision/people/leymarie/Refs/Photogrammetry/Atkinson90/C . . . , 5 pages.
Australian Office Action, dated Oct. 30, 2014, for Australian Application No. 2013204089, 5 pages.
Australian Office Action, dated Jun. 21, 2013, for Australian Application No. 2011210538, 3 pages.
Australian Office Action, dated Oct. 1, 2013, for Australian Application No. 2010219392, 4 pages.
Avrahami et al., "Extraction of 3D Spatial Polygons Based On The Overlapping Criterion For Roof Extraction From Aerial Images," *CMRT05. IAPRS, vol. XXXVI, Part 3/W24*, pp. 43-48, Vienna, Austria, Aug. 29-30, 2005. (6 pages).
Azuma et al., "View-dependent refinement of multiresolution meshes with subdivision connectivity," *Proceedings of the Second International Conference on Computer Graphics, Virtual Reality, Visualization, and Interaction (Afigraph 2003)*, Capetown, South Africa, Feb. 2003, pp. 69-78.
Bazaraa et al., *Nonlinear Programming Theory and Algorithms*, Second Edition, John Wiley & Sons, Inc., New York, 1993, 330 pages.
Bertan et al., "Automatic 3D Roof Reconstruction using Digital Cadastral Map, Architectural Knowledge and an Aerial Image," IEEE International Conference on Geoscience and Remote Sensing Symposium, Sep. 2006, pp. 1407-1410, 4 pages.
Bhat et al., "A Perceptually-Motivated Optimization-Framework for Image and Video Processing," Computer Science & Engineering Technical Report, UW-CSE-08-06-02, University of Washington, Seattle, WA, Jun. 2008, 10 pages.
Bhat et al, "Fourier Analysis of the 2D Screened Poisson Equation for Gradient Domain Problems," ECCV 2008, 14 pages.
Bhat et al., "GradientShop: A Gradient-Domain Optimization Framework for Image and Video Filtering," ACM TOG 29(2), Mar. 2010, 14 pages.
Bhat et al., "Using Photographs to Enhance Videos of a Static Scene," Eurographics Symposium on Rendering 2007, 12 pages.
Bhat et al., "Piecewise Image Registration in the Presence of Large Motions," CVPR 2006, New York, NY, Jun. 2006, 7 pages.
Brooks et al., "A Review of Position Tracking Methods," 1$^{st}$ International Conference on Sensing Technology, Palmerston North, New Zealand, Nov. 21-23, 2005, pp. 54-59. (6 pages).
Canadian Office Action, dated Mar. 24, 2014, for Canadian Application No. 2,703,423, 2 pages.
Canadian Office Action, dated Sep. 24, 2013, for Canadian Application No. 2,641,373, 4 pages.
Capell et al., "A Multiresolution Framework for Dynamic Deformations," Computer Science & Engineering Technical Report, UW-CSE-02-04-02, University of Washington, Seattle, WA, Apr. 2002, 8 pages.
Charaniya, "3D Urban Reconstruction from Aerial LiDAR data," University of California, Santa Cruz, Computer Science, 2004, 44 pages.

(56) References Cited

OTHER PUBLICATIONS

Chuang et al., "A Bayesian Approach to Digital Matting," IEEE Computer Vision and Pattern Recognition 2001, Kauai, Hawaii, Dec. 2001, 8 pages.
Chuang et al., "Animating Pictures with Stochastic Motion Textures," SIGGRAPH 2005, Los Angeles, CA, Aug. 2005, 8 pages.
Chuang et al., "Animating Pictures with Stochastic Motion Textures," Technical Report UW-CSE-04-04-02, SIGGRAPH 2005, Los Angeles, CA, Aug. 2005, 7 pages.
Chuang et al., "Environment Matting Extensions: Towards Higher Accuracy and Real-Time Capture," SIGGRAPH 2000, New Orleans, LA, Jul. 24-28, 2000, 11 pages.
Chuang et al., "Environment Matting Extensions: Towards Higher Accuracy and Real-Time Capture," Tech Report, SIGGRAPH 2000, New Orleans, LA, Jul. 24-28, 2000, 10 pages.
Chuang et al., "Shadow Matting and Compositing," SIGGRAPH 2003, San Diego, CA, Jul. 2003, 7 pages.
Cohasset, "Town Report," 2008, pp. 1-3 and 27. (4 pages).
Colburn et al., "Image-Based Remodeling," IEEE Transactions On Visualization and Computer Graphics, vol. 19, No. 1, Jan. 2013, 11 pages.
Collins et al., "The Ascender System: Automated Site Modeling from Multiple Aerial Images," *Computer Vision and Image Understanding* 72(2):143-162, 1998.
Curless et al., "Better Optical Triangulation Through Spacetime Analysis," Computer Systems Laboratory Technical Report CSL-TR-95-667, Stanford University, Stanford, CA, Apr. 1995, 12 pages.
Curless et al., "Computer model and 3D fax of Happy Buddha," retrieved Oct. 25, 2013, from http://www-graphics.stanford.edu/projects/faxing/happy/, 4 pages.
Curless et al., "A Volumetric Method for Building Complex Models from Range Images," SIGGRAPH '96, New Orleans, LA, Aug. 4-9, 1996, 10 pages.
Curless et al., "Better Optical Triangulation through Spacetime Analysis," 1995 5$^{th}$ International Conference on Computer Vision, Boston, MA, Jun. 20-23, 1995, 8 pages.
Curless, "New Methods for Surface Reconstruction from Range Images," Dissertation, Submitted to the Department of Electrical Engineering and the Committee of Graduate Studies of Stanford University, Jun. 1997, 209 pages.
Curless, "From Range Scans to 3D Models," *ACM SIGGRAPH Computer Graphics* 33(4):38-41, 1999.
Decision—Denying Petitioner's Request for Rehearing 37 C.F.R. § 42.71(d), Case IPR2016-00582, *Xactware Solutions, Inc.*, v. *Eagle View Technologies, Inc.*, U.S. Pat. No. 8,078,436 B2, Sep. 21, 2016, 4 pages.
Decision—Denying Institution of Inter Partes Review 37 C.F.R. § 42.108, Case IPR2016-00582, *Xactware Solutions, Inc.*, v. *Eagle View Technologies, Inc.*, U.S. Pat. No. 8,078,436 B2, Aug. 16, 2016, 8 pages.
Decision—Institution of Inter Partes Review 37 C.F.R. § 42.108, Case IPR2016-00589, *Xactware Solutions, Inc.*, v. *Eagle View Technologies, Inc.*, U.S. Pat. No. 8,825,454 B2, Aug. 15, 2016, 20 pages.
Decision—Institution of Inter Partes Review 37 C.F.R. § 42.108, Case IPR2016-00591, *Xactware Solutions, Inc.*, v. *Eagle View Technologies, Inc.*, U.S. Pat. No. 8,209,152 B2, Aug. 15, 2016, 19 pages.
Decision—Denying Institution of Inter Partes Review 37 C.F.R. § 42.108, Case IPR2016-00587, *Xactware Solutions, Inc.*, v. *Eagle View Technologies, Inc.*, U.S. Pat. No. 9,129,376 B2, Aug. 15, 2016, 13 pages.
Decision—Institution of Inter Partes Review 37 C.F.R. § 42.108, Case IPR2016-00590, *Xactware Solutions, Inc.*, v. *Eagle View Technologies, Inc.*, U.S. Pat. No. 8,818,770 B2, Aug. 15, 2016, 18 pages.
Decision—Denying Institution of Inter Partes Review 37 C.F.R. § 42.108, Case IPR2016-00586, *Xactware Solutions, Inc.*, v. *Eagle View Technologies, Inc.*, U.S. Pat. No. 8,170,840 B2, Aug. 16, 2016, 14 pages.

Declaration of Lynn Berard, In re Inter Partes Review of U.S. Pat. No. 8,078,436, dated Aug. 24, 2016, 4 pages.
Declaration of Harold Schuch, In re Inter Partes Review of U.S. Pat. No. 8,078,436, dated Feb. 5, 2016, 36 pages.
Declaration of Harold Schuch, In re Inter Partes Review of U.S. Pat. No. 9,129,376, dated Feb. 5, 2016, 43 pages.
Declaration of Harold Schuch, In re Inter Partes Review of U.S. Pat. No. 8,170,840, dated Feb. 5, 2016, 39 pages.
Declaration of Harold Schuch, In re Inter Partes Review of U.S. Pat. No. 8,818,770, dated Feb. 5, 2016, 38 pages.
Declaration of Harold Schuch, In re Inter Partes Review of U.S. Pat. No. 8,818,770, dated Oct. 5, 2016, 41 pages.
Declaration of Harold Schuch, In re Inter Partes Review of U.S. Pat. No. 8,078,436, dated Sep. 12, 2016, 37 pages.
Declaration of Harold Schuch, In re Inter Partes Review of U.S. Pat. No. 8,078,436, dated Oct. 4, 2016, 40 pages.
Declaration of Harold Schuch In re Inter Partes Review of: U.S. Pat. No. 8,209,152, dated Feb. 5, 2016, 38 pages.
Declaration of Harold Schuch, In re Inter Partes Review of U.S. Pat. No. 8,209,152, dated Oct. 5, 2016, 36 pages.
Declaration of Harold Schuch, In re Inter Partes Review of U.S. Pat. No. 8,825,454, dated Feb. 5, 2016, 35 pages.
Declaration of Harold Schuch, In re Inter Partes Review of U.S. Pat. No. 8,825,454, dated Oct. 5, 2016, 41 pages.
Declaration of Harold Schuch, In re Inter Partes Review of U.S. Pat. No. 9,135,737, dated Feb. 5, 2016, 36 pages.
*Eagle View Tech.* v. *Aerialogics LLC*, Case No. 2:12-cv-00618-RAJ, Prior Art Presentation, Aug. 17, 2012, 61 pages.
ECE 390, Introduction to Optimization, Spring 2004, Introductory Course, retrieved Oct. 25, 2013, from http://liberzon.csl.illinois.edu/04ECE390.html, 1 page.
Ex Parte Reexamination Certificate (11th), Ex Parte Reexamination Ordered under 35 U.S.C. 257, for U.S. Pat. No. 8,078,436 C1, Pershing et al., "Aerial Roof Estimation Systems and Methods," certificate issued Aug. 27, 2014, 3 pages.
Faugeras, "What can be seen in three dimensions with an uncalibrated stereo rig?," *Computer Vision—ECCV '92*: 563-578, 1992. (18 pages).
FirstSearch: WorldCat Detailed Record (Staff View), "Digital Photogrammetry," retrieved from http://www.firstsearch.oclc.org/WebZ/FSFETCH?fetchtype=fullrecord:sessionid=fsapp1-3 . . ., retrieved on Oct. 3, 2016, 8 pages.
Fisher et al., *Dictionary of Computer Vision and Image Processing*, John Wiley & Sons, Ltd., West Sussex, England, 2005, 182 pages.
Forlani et al., "Complete classification of raw LIDAR data and 3D reconstruction of buildings," *Pattern Anal Applic* 8:357-374, 2006.
Furukawa et al., "Manhattan-world Stereo," CVPR 2009, Miami, Florida, Jun. 2009, 8 pages.
Furukawa et al., "Reconstructing Building Interiors from Images," ICCV 2009, Kyoto, Japan, Sep. 2009, 8 pages.
Furukawa et al, "Towards Internet-scale Multi-view Stereo," CVPR 2010, Jun. 2010, 8 pages.
Georgeiv et al., "Spatio-Angular Resolution Tradeoff in Integral Photography," Proceedings of Eurographics Symposium on Rendering, 2006, 10 pages.
Geospatial Information Systems Council, "Pictometry: Oblique Imagery from training," 2009, retrieve from http://www.ct.gov/gis/cwp/view.asp?q=425874&a=3033&pp=3, retrieved on Sep. 7, 2016, 3 pages.
GIS Working Group Meeting Minutes, Jan. 22, 2007, 17 pages.
Gleicher, "Image Snapping," Advanced Technology Group, Apple Computer, Inc., pp. 183-190, 1995.
Goesele et al., "Multi-View Stereo for Community Photo Collections," Proceedings of ICCV 2007, Rio de Janeiro, Brazil, Oct. 2007, 8 pages.
Goesele et al., "Multi-View Stereo Revisited," CVPR 2006, New York, NY, Jun. 2006, 8 pages.
Goldman et al., "Interactive Video Object Annotation," Computer Science & Engineering Technical Report, UW-CSE-07-04-01, University of Washington, Seattle, WA, Apr. 2007, 7 pages.
Goldman et al., "Schematic Storyboarding for Video Editing and Visualization." SIGGRAPH 2006, Boston, MA, Aug. 2006, 10 pages.

(56) References Cited

OTHER PUBLICATIONS

Goldman et al., "Shape and Spatially-Varying BRDFs From Photometric Stereo," IEEE Transactions on Pattern Analysis and Machine Intelligence, vol. 32, No. 6, Jun. 2010, 12 pages.
Goldman et al., "Shape and Spatially-Varying BRDFs From Photometric Stereo," ICCV 2005, Beijing, China, Oct. 2005, 8 pages.
Goldman et al., "Video Object Annotation, Navigation, and Composition," UIST 2008, 10 pages.
Gonzalez et al., *Digital Image Processing*, Addison-Wesley Publishing Company, Inc., Reading, Massachusetts, 1993, 372 pages.
Gupta et al., "Enhancing and Experiencing Spacetime Resolution with Videos and Stills," Computer Science & Engineering Technical Report, UW-CSE-04-08-01, University of Washington, Seattle, WA, Apr. 2008, 6 pages.
Gupta et al., "DuploTrack: A Real-time System for Authoring and Guiding Duplo Block Assembly," UIST 2012, Boston, MA, Oct. 2012, 13 pages.
Gupta et al., "Enhancing and Experiencing Spacetime Resolution with Video and Stills," ICCP 2009, San Francisco, CA, Apr. 2009, 9 pages.
Gupta et al., "Single Image Deblurring Using Motion Density Functions," ECCV 2010, Crete, Greece, Sep. 2010, 14 pages.
Hartley et al., "2.4 A Hierarchy of Transformations", Multiple View Geometry in Computer Vision, Cambridge University Press, Second Edition, 2003, 9 pages.
Hartley et al., "Appendix 6: Iterative Estimation Methods," Multiple View Geometry in Computer Vision, Cambridge University Press, Second Edition, 2003, 34 pages.
Hartley et al., "Invariant and Calibration-Free Methods in Scene Reconstruction and Object Recognition," Final Technical Report, Feb. 28, 1997, 266 pages.
Hartley et al., *Multiple View Geometry in Computer Vision*, Second Edition, Cambridge University Press, Cambridge, England, 2003, 672 pages.
Held et al., "3D Puppetry: A Kinect-based Interface for 3D Animation," UIST 2012, Boston, MA, Oct. 2012, 11 pages.
Henricsson et al., "Project Amobe: Strategies, Current Status and Future Work," International Archives of Photogrammetry and Remote Sensing, vol. XXXI, Part B3, Vienna, pp. 321-330, 1996. (10 pages).
Hsieh, "Design and Evaluation of a Semi-Automated Site Modeling System," Technical Report CS-95-195, Carnegie Mellon University, Nov. 1995, 84 pages.
Hsieh, "SiteCity: A Semi-Automated Site Modelling System," Proceedings of the IEEE Computer Society Conference on Computer Vision and Pattern Recognition, Jun. 18-20, 1996, San Francisco, California, pp. 499-506.
Hudson, "Merging VRML Models: Extending the Use of Photomodeller," Thesis, in TCC 402, Presented to the Faculty of the School of Engineering and Applied Science, University of Virginia, Mar. 23, 1998, 23 pages.
International Search Report for International Application No. PCT/US2013/023503, dated Apr. 30, 2013, 5 pages.
International Search Report and Written Opinion of the International Searching Authority, dated Nov. 13, 2013, for International Application No. PCT/US2013/024523, 15 pages.
ISPRS Archives—vol. XXXVI-3/W24, 2005, retrieved from http://www.isprs.org/proceedings/XXXVI/3-W24/ retrieved on Sep. 7, 2016, 5 pages.
Jaynes et al., "Recognition and reconstruction of buildings from multiple aerial images," *Computer Vision and Image Understanding* 90:68-98, 2003.
Kolman, "Chapter 4, Linear Transformations and Matrices, 4.1: Definition and Examples," Elementary Linear Algebra, Second Edition, Macmillan Publishing Co,. Inc., 1997, 12 pages.
KP Building Products, "Vinyl Siding Estimating and Installation Guide," 2007, 32 pages.
Krainin et al., "Autonomous Generation of Complete 3D Object Models Using Next Best View Manipulation Planning," ICRA 2011, Shanghai, China, May 2011, 7 pages.
Kushal et al., "Photo Tours," 3DimPVT, Oct. 2012, 8 pages.
Läbe et al., "Robust Techniques for Estimating Parameters of 3D Building Primitives," International Society for Photogrammetry and Remote Sensing vol. 32, Part 2, Commission II, Proceedings of the Commission II Symposium, Data Integration Techniques, Jul. 13-17, 1998, 16 pages.
LAR-IAC2 Product Guide, for the Los Angeles Region Imagery Acquisition Consortium (LAR-IAC) Program, Sep. 2008, 16 pages.
LARIAC1 Pictometry Training, 2009, retrieved from http://egis3.lacounty.gov/dataportal/lariac/lariac-archives/lariacl-archive/lariac1-pictometr . . ., retrieved Sep. 15, 2016, 2 pages.
Levoy et al., "The Digital Michelangelo Project: 3D Scanning of Large Statues," SIGGRAPH 2000, New Orleans, LA, Jul. 24-28, 2000, 14 pages.
Levoy, "The Digital Michelangelo Project," retrieved Oct. 25, 2013, from http://www-graphics.stanford.edu/projects/mich/, 10 pages.
Li et al., "Automated Generation of Interactive 3D Exploded View Diagrams," ACM Transactions on Graphics 27(3), SIGGRAPH 2007, Aug. 2007, 7 pages.
Li et al., "Interactive Cutaway Illustration of Complex 3D Models," ACM Transactions on Graphics 26(3), SIGGRAPH 2007, Aug. 2007, 11 pages.
"Los Angeles County Extends its License Agreement with Pictometry for New Oblique Aerial Photos," Mar. 7, 2006, retrieved from http://www.directionsmag.com/pressreleases/los-angeles-county-extends-its-license-agree . . ., retrieved on Sep. 15, 2016, 5 pages.
Mahajan et al., "A Theory Of Frequency Domain Invariants: Spherical Harmonic Identities for BRDF/Lighting Transfer and Image Consistency," IEEE Pattern Analysis and Machine Intelligence, 30(2), Feb. 2008, 14 pages.
Mahajan et al., "A Theory of Spherical Harmonic Identities for BRDF/Lighting Transfer and Image Consistency," ECCV 2006, Graz, Austria, May 2006, 14 pages.
MARC 21 Bibliographic, "005—Data and Time of Latest Transaction (NR)," Library of Congress, Feb. 1999, retrieved from http://www.loc.gov/marc/bibliographic/bd005.html on Sep. 8, 2016, 2 pages.
MARC Record, for Hsieh, "Design and Evaluation of a Semi-Automated Site Modeling System," Digital Mapping Laboratory, School of Computer Science, Carnegie Mellon University, Pittsburgh, PA, CMU-CS-95-195, Nov. 1995, 76 pages, retrieved on Aug. 17, 2016, retrieved from http://search.library.cm.u.edu/vufind/Record/465462/Details#tabnav, 3 pages.
McGlone et al., "Projective and Object Space Geometry for Monocular Building Extraction," IEEE Computer Society Conference on Computer Vision and Pattern Recognition, Jun. 21-23, 1994, Seattle, Washington, pp. 54-61.
McKeown et al., "Chapter 9: Feature Extraction and Object recognition, Automatic Cartographic Feature Extraction Using Photogrammetric Principles," in Digital Photogrammetry: An Addendum to the Manual of Photogrammetry, Greve, C., (ed.), Bethesda, Maryland, American Society for Photogrammetry and Remote Sensing, 1996, 19 pages.
Merriam-Webster, "Compass Bearing," Definition, 2 pages.
Mikhail et al., *Introduction to Modern Photogrammetry*, John Wiley & Sons, Inc., New York, 2001, 247 pages.
Noronha et al., "Detection and Modeling of Buildings from Multiple Aerial Images," *IEEE Transactions on Pattern Analysis and Machine Intelligence* 23(5):2-32, May 2001.
Notice of Allowance, dated Jun. 13, 2014, for U.S. Appl. No. 13/438,288, Pershing, "Pitch Determination Systems and Methods for Aerial Roof Estimation" 12 pages.
Notice of Allowance, dated Jun. 13, 2014, for U.S. Appl. No. 13/474,504, Pershing, "Concurrent Display Systems and Methods for Aerial Roof Estimation," 13 pages.
Notice of Allowance, dated Jun. 22, 2015, for U.S. Appl. No. 14/450,108, Pershing, "Concurrent Display Systems and Methods for Aerial Roof Estimation," 15 pages.
Notice of Allowance, dated Oct. 3, 2016, for U.S. Appl. No. 13/019,228, Pershing et al., "Geometric Correction of Rough Wireframe Models Derived From Photographs," 7 pages.

(56) References Cited

OTHER PUBLICATIONS

Notice of Allowance, dated Nov. 25, 2013, for U.S. Appl. No. 13/757,712, Pershing, "Systems and Methods for Estimation of Building Floor Area," 37 pages.
Notice of Allowance, dated Dec. 26, 2013, for U.S. Appl. No. 13/757,712, Pershing, "Systems and Methods for Estimation of Building Floor Area," 17 pages.
Notice of Allowance, dated Aug. 26, 2016, for U.S. Appl. No. 14/195,543, Pershing et al., "Aerial Roof Estimation Systems and Methods," 23 pages.
Notice of Allowance, dated Dec. 19, 2013, for U.S. Appl. No. 13/287,954, Pershing et al., "Aerial Roof Estimation Systems and Methods," 40 pages.
Office Action, dated Aug. 14, 2013, for U.S. Appl. No. 13/843,437, Ekman, "Price Estimation Tool," 9 pages.
Office Action, dated Jul. 18, 2013, for U.S. Appl. No. 13/757,712, Pershing, "Systems and Methods for Estimation of Building Floor Area," 18 pages.
Office Action, dated Oct. 8, 2013, for U.S. Appl. No. 13/757,694, Pershing, "Systems and Methods for Estimation of Building Wall Area," 15 pages.
Office Action, dated Dec. 16, 2013, for U.S. Appl. No. 13/438,288, Pershing, "Pitch Determination Systems and Methods for Aerial Roof Estimation," 23 pages.
Office Action, dated Dec. 20, 2013, for U.S. Appl. No. 13/474,504, Pershing, "Concurrent Display Systems and Methods for Aerial Roof Estimation," 24 pages.
Office Action, dated Dec. 30, 2014, for U.S. Appl. No. 14/450,108, Pershing, "Concurrent Display Systems and Methods for Aerial Roof Estimation," 32 pages.
Office Action, dated Sep. 12, 2016, for U.S. Appl. No. 13/954,832, Pershing et al., "Aerial Roof Estimation Systems and Methods," 34 pages.
Perlant et al., "Scene registration in aerial image analysis," date of original version: 1989, retrieved from http://repository.cmu.edu/compsci/1859, retrieved on Sep. 7, 2016, 3 pages.
Perlant et al., "Scene Registration in Aerial Image Analysis," 1989, retrieved from http://proceedings.spiedigitallibrary.org/proceedings.aspx?articleid=1257182, retrieved on Sep. 7, 2016, 3 pages.
Perlant et al., "Scene Registration in Aerial Image Analysis," Photogrammetric Engineering and Remote Sensing 56(4):481-493, Apr. 1990.
Pershing, "Concurrent Display Systems and Methods for Aerial Roof Estimation," Amendment, filed Nov. 30, 2011, for U.S. Appl. No. 12/467,250, 15 pages.
Pershing, "Concurrent Display Systems and Methods for Aerial Roof Estimation," Amendment, filed Apr. 16, 2014, for U.S. Appl. No. 13/474,504, 9 pages.
Pershing, "Concurrent Display Systems and Methods for Aerial Roof Estimation," Amendment, filed Nov. 19, 2013, for U.S. Appl. No. 13/474,504, 21 pages.
Pershing, "Concurrent Display Systems and Methods for Aerial Roof Estimation," Amendment, filed Feb. 28, 2013, for U.S. Appl. No. 13/474,504, 13 pages.
Pershing, "Concurrent Display Systems and Methods for Aerial Roof Estimation," Amendment, filed Jun. 1, 2015, for U.S. Appl. No. 14/450,108, 18 pages.
Pershing, "Concurrent Display Systems and Methods for Aerial Roof Estimation," Amendment After Allowance, filed Jul. 31, 2015, for U.S. Appl. No. 14/450,108, 14 pages.
Pershing et al., "Automated Techniques for Roof Estimation," U.S. Appl. No. 61/197,072, filed Oct. 31, 2008, 32 pages.
Pershing et al., "Automated Techniques for Roof Estimation," U.S. Appl. No. 61/197,895, filed Oct. 31, 2008, 32 pages.
Pershing et al., "Aerial Roof Estimation Systems and Methods," U.S. Appl. No. 14/195,543, filed Jun. 29, 2016, 13 pages.
Pershing et al., "Aerial Roof Estimation Systems and Methods," U.S. Appl. No. 13/287,954, Feb. 28, 2013, 14 pages.
Pershing et al., "Aerial Roof Estimation Systems and Methods," U.S. Appl. No. 13/287,954, Nov. 22, 2013, 25 pages.
Petition for Inter Partes Review of U.S. Pat. No. 8,170,840, issued May 1, 2012, "Pitch Determination Systems and Methods for Aerial Roof Estimation," dated Feb. 8, 2016, 67 pages.
Petition for Inter Partes Review of U.S. Pat. No. 8,170,840, issued May 1, 2012, "Pitch Determination Systems and Methods for Aerial Roof Estimation," dated Feb. 18, 2016, 65 pages.
Petition for Inter Partes Review of U.S. Pat. No. 8,170,840, dated May 1, 2012, "Pitch Determination Systems and Methods for Aerial Roof Estimation," dated Apr. 8, 2016, 62 pages.
Petition for Inter Partes Review of U.S. Pat. No. 8,818,770, issued Sep. 8, 2015, "Pitch Determination Systems and Methods for Aerial Roof Estimation," dated Feb. 8, 2016, 64 pages.
Petition for Inter Partes Review of U.S. Pat. No. 8,818,770, issued Aug. 26, 2014, "Pitch Determination Systems and Methods for Aerial Roof Estimation," dated Oct. 5, 2016, 68 pages.
Petition for Inter Partes Review of U.S. Pat. No. 9,129,376, issued Sep. 8, 2015, "Pitch Determination Systems and Methods for Aerial Roof Estimation," dated Feb. 8, 2016, 67 pages.
Petition for Inter Partes Review of U.S. Pat. No. 9,129,376, issued Sep. 8, 2015, "Pitch Determination Systems and Methods for Aerial Roof Estimation," dated Feb. 18, 2016, 66 pages.
Petition for Inter Partes Review of U.S. Pat. No. 9,129,376, issued Sep. 8, 2015, "Pitch Determination Systems and Methods for Aerial Roof Estimation," dated Apr. 8, 2016, 64 pages.
Petition for Inter Partes Review of U.S. Pat. No. 8,078,436, issued Dec. 13, 2011, "Aerial Roof Estimation Systems and Methods," dated Feb. 8, 2016, 66 pages.
Petition for Inter Partes Review of U.S. Pat. No. 8,078,436, issued Dec. 13, 2011, "Aerial Roof Estimation Systems and Methods," dated Sep. 12, 2016, 67 pages.
Petition for Inter Partes Review of U.S. Pat. No. 8,078,436, issued Dec. 13, 2011, "Aerial Roof Estimation Systems and Methods," dated Oct. 5, 2016, 68 pages.
Petition for Inter Partes Review of U.S. Pat. No. 8,209,152, issued Jun. 26, 2012, "Concurrent Display Systems and Methods for Aerial Roof Estimation," dated Feb. 8, 2016, 65 pages.
Petition for Inter Partes Review of U.S. Pat. No. 8,209,152, issued Jun. 26, 2012, "Concurrent Display Systems and Methods for Aerial Roof Estimation," dated Feb. 24, 2016, 65 pages.
Petition for Inter Partes Review of U.S. Pat. No. 8,209,152, issued Jun. 26, 2012, "Concurrent Display Systems and Methods for Aerial Roof Estimation," dated Apr. 8, 2016, 61 pages.
Petition for Inter Partes Review of U.S. Pat. No. 8,209,152, issued Jun. 26, 2012, "Concurrent Display Systems and Methods for Aerial Roof Estimation," dated Oct. 7, 2016, 50 pages.
Petition for Inter Partes Review of U.S. Pat. No. 8,825,454, issued Sep. 2, 2014, "Concurrent Display Systems and Methods for Aerial Roof Estimation," dated Feb. 8, 2016, 47 pages.
Petition for Inter Partes Review of U.S. Pat. No. 8,825,454, issued Sep. 2, 2014, "Concurrent Display Systems and Methods for Aerial Roof Estimation," dated Feb. 23, 2016, 47 pages.
Petition for Inter Partes Review of U.S. Pat. No. 8,825,454, issued Sep. 2, 2014, "Concurrent Display Systems and Methods for Aerial Roof Estimation," dated Oct. 5, 2016, 63 pages.
Petition for Inter Partes Review of U.S. Pat. No. 9,135,737, issued Sep. 15, 2015, "Concurrent Display Systems and Methods for Aerial Roof Estimation," dated Feb. 8, 2016, 67 pages.
Petitioner's Motion for Pro Hac Vice Admission of Scott S. Christie Under 37 C.F.R. § 42.10, *Xactware Solutions, Inc.* v. *Eagle View Technologies. Inc.*, Case IPR2016-01775, U.S. Pat. No. 8,078,436, dated Oct. 24, 2016, 6 pages.
Petitioner's Motion for Pro Hac Vice Admission of Scott S. Christie Under 37 C.F.R. § 42.10, *Xactware Solutions, Inc.* v. *Eagle View Technologies. Inc.*, Case IPR2016-00591, U.S. Pat. No. 8,209,152, dated Oct. 24, 2016, 5 pages.
Petitioner's Motion for Pro Hac Vice Admission of Scott S. Christie Under 37 C.F.R. § 42.10, *Xactware Solutions, Inc.* v. *Eagle View Technologies. Inc.*, Case IPR2016-00589, U.S. Pat. No. 8,825,454, dated Oct. 24, 2016, 5 pages.
Petitioner's Motion for Pro Hac Vice Admission of Scott S. Christie Under 37 C.F.R. § 42.10, *Xactware Solutions, Inc.* v. *Eagle View Technologies. Inc.*, Case IPR2016-00592, U.S. Pat. No. 9,135,737, dated Oct. 24, 2016, 5 pages.

(56) References Cited

OTHER PUBLICATIONS

Petitioner's Motion for Pro Hac Vice Admission of Scott S. Christie Under 37 C.F.R. § 42.10, *Xactware Solutions, Inc.* v. *Eagle View Technologies. Inc.*, Case IPR2016-00590, U.S. Pat. No. 8,818,770, dated Oct. 24, 2016, 5 pages.
Petitioner's Request for Rehearing—Decision—Denied, 37 C.F.R. § 42.71(d), Case IPR2016-00587, *Xactware Solutions, Inc.*, v. *Eagle View Technologies, Inc.*, U.S. Pat. No. 9,129,376 B2, Sep. 30, 2016, 11 pages.
Petitioner's Request for Rehearing Pursuant to 37 C.F.R. §§ 42.71 (c) and (d), Case IPR2016-00582, *Xactware Solutions, Inc.*, v. *Eagle View Technologies, Inc.*, U.S. Pat. No. 8,078,436 B2, Sep. 9, 2016, 12 pages.
Pictometry, "Electronic Field Study™ User Guide," Version 2.7, Jul. 2007, 508 pages. (537 pages).
"Pictometry Announces Technical Advancements for GIS Professionals," Dec. 7, 2006, retrieved from http://www.directionsmag.com/pressreleases/pictometry-announces-technical-advancements . . ., retrieved on Sep. 7, 2016, 11 pages.
"Pictometry Announces Technical Advancements for GIS Professionals," Dec. 5, 2006, retrieved from http://gisuser.com/2006/12/pictometry-announces-technical-advancements-for-gis-professi . . ., retrieved on Sep. 15, 2016, 16 pages.
Pictometry License Guidelines, Jan. 26, 2005, 3 pages.
Pictometry, "Power Point Presentation," Apr. 19, 2007, 21 pages.
Pictometry, "Welcome to Your End User Training Power Point Presentation," 47 pages.
Pictometry Administrative Training, Power Point Presentation, 40 pages.
Pictometry Administrative Training, Power Point Presentation, Metadata, 2 pages.
Pictometry Administrative Training, Handout, 2 pages.
Pictometry, "Oblique Image Library Instructions—Information for Utilization," Oct. 2008, 8 pages.
Portions of File History, dated Oct. 25, 2013, for U.S. Reexamination Application No. 96/000,004, Pershing et al., "Aerial Roof Estimation System and Method," filed Oct. 31, 2008, 225 pages.
"Proceedings of SPIE," SPIE, retrieved from http://proceedings.spiedigitallibrary.org/conferenceproceedings.aspx, retrieved on Sep. 7, 2016, 3 pages.
"R2V User's Manual, Advanced Raster to Vector Conversion Software," Publicly available Sep. 16, 2000, Able Software Corp., Lexington, MA, 164 pages.
Reddy et al., "Frequency-Space Decomposition and Acquisition of Light Transport under Spatially Varying Illumination," ECCV 2012, Florence, Italy, Oct. 2012, 15 pages.
Seitz et al., "A Comparison and Evaluation of Multi-view Stereo Reconstruction Algorithms," CVPR 2006, New York, NY, Jun. 2006, 8 pages.
Sengül, "Extracting Semantic Building Models From Aerial Stereo Images and Conversion to Citygml," Thesis, Istanbul Technical University Institute of Science and Technology, May 2010, 138 pages.
Shahrabi, "Automatic Recognition and 3D Reconstruction of Buildings through Computer Vision and Digital Photogrammetry," Institut für Photogrammetrie der Universität Stuttgart, 2000. pp. 5-110.
Shan et al., "Refractive Height Fields from Single and Multiple Images," CVPR 2012, Providence, RI, Jun. 2012, 8 pages.
Shan et al., "Refractive Height Fields from Single and Multiple Images," CVPR 2012, Providence, RI, Jun. 2012, poster, 1 page.
Steuer, "Height Snakes: 3D Building Reconstruction from Aerial Image and Laser Scanner Data," Joint Urban Remote Sensing Event, Munich, Germany, Apr. 11-13, 2011, pp. 113-116.
Table containing all archives of The International Archives of the Photogrammetry, Remote Sensing and Spatial Information Sciences, retrieved from http://www.isprs.org/publications/archives.aspx, retrieved on Sep. 7, 2016, 11 pages.
University of Washington, College of Arts & Sciences, Mathematics, Course Offerings, Autumn Quarter 2013 and Winter Quarter 2014, retrieved Oct. 25, 2013, from http://www.washington.edu/students/crscat/math.html, 16 pages.
Wattenberg et al., "Area, Volume, and Torque in Three Dimensions," retrieved on Sep. 24, 2013, from http://www.math.montana.edu/frankw/ccp/multiworld/twothree/atv/learn.htm, 14 pages.
Weeks et al., "A Real-Time, Multichannel System with Parallel Digital Signal Processors," *Proceedings of IEEE International Conference on Acoustics, Speech and Signal Processing(ICASSP 1990) 3*: 1787-1790, Apr. 1990.
Wood et al., "Surface Light Fields for 3D Photography," SIGGRAPH 2000, New Orleans, LA, Jul. 24-28, 2000, 10 pages.
Written Opinion for International Application No. PCT/US2013/023503, dated Apr. 30, 2013, 4 pages.
Written Opinion for International Application No. PCT/US2013/023502, dated Apr. 30, 2013, 3 pages.
Wu et al., "Multicore Bundle Adjustment," CVPR 2011, Colorado Springs, CO, Jun. 2011, 8 pages.
Wu et al., "Schematic Surface Reconstruction," CVPR 2012, Providence, RI, Jun. 2012, 1 page.
www.archive.org Web site showing alleged archive of PhotoModeler Web Site http://www.photomodeler.com/pmpro08.html from Feb. 9, 2006 (retrieved Oct. 21, 2013), 4 pages.
YouTube, "Pictometry Online Webinar for MAIA Members," uploaded Apr. 8, 2011, retrieved from http://www.youtube.com/watch?v=RzAXK2avqQQ, 2 pages.
Zhang et al., "Rapid Shape Acquisition Using Color Structured Light and Multi-Pass Dynamic Programming," International Symposium on 3D Data Processing Visualization and Transmission, Padova, Italy, Jun. 2002, 13 pages.
Zhang et al., "Shape and Motion Under Varying Illumination: Unifying Structure from Motion, Photometric Stereo, and Multi-view Stereo," ICCV 2003, Nice, France, Oct. 2003, 8 pages.
Zhang et al., "Spacetime Stereo: Shape Recovery for Dynamic Scenes," CVPR 2003, Madison, Wisconsin, Jun. 2003, 8 pages.
Zheng et al., "A Consistent Segmentation Approach to Image-based Rendering," Technical Report CSE-09-03-02, 2002, 8 pages.
Zheng et al., "Parallax Photography: Creating 3D Cinematic Effects form Stills," Proceedings of Graphics Interface 2009, Kelowna, BC, CA, May 2009, 8 pages.
Zongker et al., "Environment Matting and Compositing," SIGGRAPH '99, Los Angeles, CA, Aug. 9-13, 1999, 10 pages.
Canadian Intellectual Property Office, Office Action regarding Canadian Patent Application No. 2,801,486, dated Sep. 7, 2016.
Eagle View Technologies, Inc., Response to Office Action regarding Canadian Patent Application No. 2,801,486, dated Mar. 7, 2017.
Canadian Intellectual Property Office, Office Action regarding Canadian Patent Application No. 2,801,486, dated Aug. 29 2017.

\* cited by examiner

GEOMETRIC CORRECTION OF ROUGH WIREFRAME MODELS DERIVED FROM PHOTOGRAPHS

BACKGROUND

Technical Field

This invention is in the field of computer modeling of physical objects and, in particular, the generation of a three-dimensional model using one or more two-dimensional photographs as a starting data set.

Description of the Related Art

Several methods can be employed to generate a three-dimensional computer model of a roof in the form of a wire-frame using one or more overhead photographs.

A first method is to trace the image in the photograph with or without user input. Using this tracing method on a photograph that provides a nearly top-down view of the structure of interest, a computer-aided design (CAD) tool allows lines and polygons to be drawn over the background image. The resulting wireframe model reflects the lines and contours of interest in the locations they are observed in the photograph.

While this method has the advantage that it is fast and compatible with many off-the-shelf CAD and drawing tools that do not require much training, there are a number of disadvantages. One disadvantage is that incorrect line lengths on sloped roof facets will result when the image is not taken from directly overhead, resulting in a "lean" of the roof within the image.

Another disadvantage is that there is a poor ability to correctly determine pitches on sloped roof facets.

Other problems are a poor determination of layered or underhanging roof sections. This first method requires a user to have previous knowledge of the roof facet pitches to obtain a wireframe without errors.

A second method is for a user to select and align roof 'primitives' over a photograph.

Like the previous method, an overhead photograph is selected as a backdrop starting point for a CAD tool. However, rather than tracing lines and polygons, the CAD tool allows the user to overlay, resize, and connect common geometric roof forms stored as primitives. Gables and hips are examples of commonly found primitive forms used in roof designs. The photograph provides a visual reference for the selection and placement by the user of these higher-level objects.

While this method has the advantage that a skilled operator can produce geometrically correct models, it has the disadvantage that it is harder to create from an image and it becomes more time consuming with increasing roof complexity.

In addition, complex user interface software is required, which requires greater training.

This second method also requires subjective technician judgments by the user to compensate for lean artifacts due to lean and shadows in images.

The user must also have previous knowledge of the roof facet pitches to correctly size the roof.

A third method is for a user to obtain and work with one or more photographs of the same roof taken from different angles in order to trace a 3D wire model of the roof.

This method starts with a set of photographs that are analyzed to derive a virtual 3D volume that is geometrically consistent with all the supplied viewpoints of the target roof. The line segments comprising the wireframe are then drawn in 3D-space and projected back onto the set of photographs to assess the correct placement within the derived 3D volume. The details of this method are described in prior U.S. patent applications owned by the assignee, EagleView Technologies, and bearing U.S. patent application Ser. Nos. 12/148,439; 12/253,092; 12/590,131; 12/467,244; and 12/467,250.

The advantage of this third method is that it does not require previous knowledge of roof facet pitches, rather, pitches are derived from the content of the photograph(s). It also produces geometrically correct models. Unfortunately, the detailed 3D model made this way cannot be easily imported to some widely used home construction CAD software programs.

The disadvantages of this third method are that greater training is required as compared to the first method and it becomes harder and more time consuming with increasing roof complexity without further processing or touch-up of the model to meet import requirements of the 3rd party software. To summarize, the first method provides a fast and simple means of generating a wire frame model of a roof at the expense of decreased accuracy and a dependence on having previous knowledge of the roof facet pitches to complete the model.

The second method sacrifices some speed and ease of use in exchange for a more consistent model and a dependency on having previous knowledge of the roof facet pitches to complete the model.

The third method also sacrifices speed and requires more user skill than the first method, but the resulting model is a very accurate reflection of the correct geometric form of the house in the photograph and does not depend on previous knowledge of the roof facet pitches.

SUMMARY OF THE INVENTION

The present invention provides a method of forming both a 2D and a 3D wireframe model in computer software that are accurate and geometrically correct. Further, the technique does not require prior knowledge of the roof facet pitches. The produced model can be easily converted into formats compatible with import into 3rd party CAD software.

Five technology components have been developed as part of the inventive solution:
1) Wireframe rectification, either 2D or 3D;
2) Derivation of metadata from the original wireframe;
3) In-plane normalization;
4) Extrusion into a "rough" 3D wireframe; and
5) Correction of a 3D wireframe.

While each of the five components contributes to the overall solution, each can be used independently or in various combinations to yield improvements in obtaining a 2D or 3D wire model as discussed below.

DETAILED DESCRIPTION

Figure 1A:
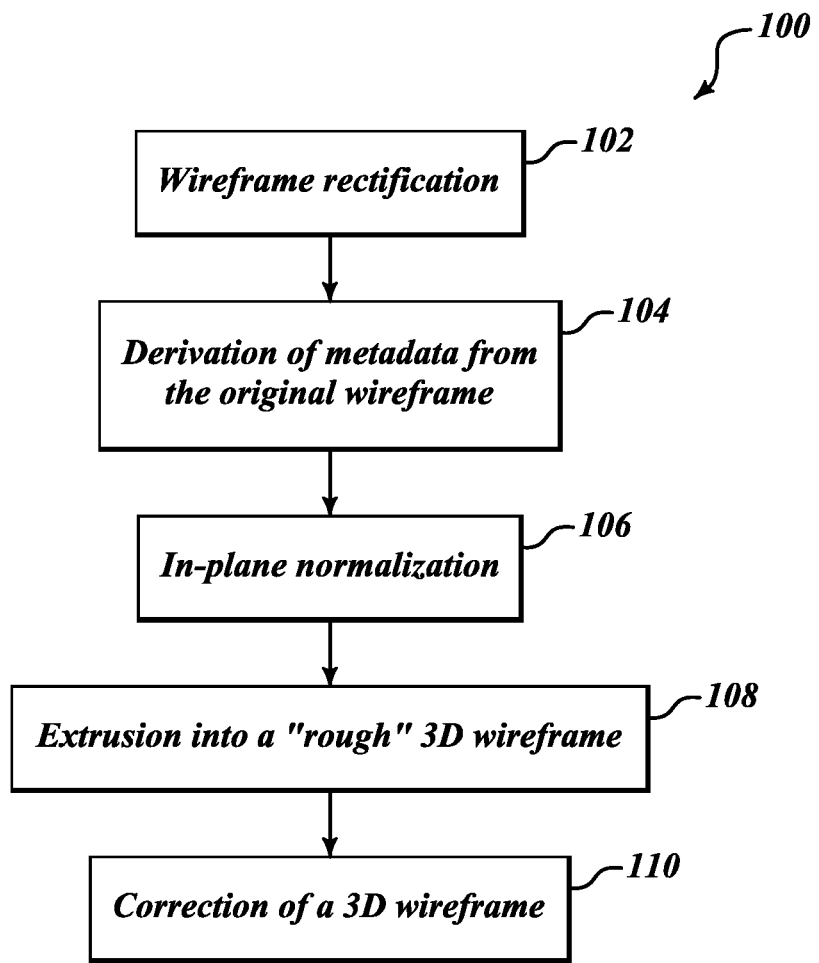
FIG. 1A is a flow chart showing an example process of geometric correction of rough wireframe models derived from photographs, according to one embodiment of the present invention.

FIG. 1A is a flow chart showing an example process 100 of geometric correction of rough wireframe models derived from photographs, according to one embodiment. In particular, FIG. 1A illustrates process 100 that may be performed or implemented by, for example, one or more software modules or components or any combination of suitable hardware, firmware or software components or devices including those that are a part of or configure the computing environment of FIG. 7.

While each of the steps shown in FIG. 1A contributes to the overall solution, each can be used independently or in various combinations to yield improvements in obtaining a 2D or 3D wire model as discussed below. Below is an overview of each step in the process, which will be followed by a more detailed discussion of each step.

At 102, the process performs wireframe rectification. This is a pre-cursor step that can optionally be used within or as a precursor to each of the other four steps that follow. The algorithm can work with either a 2D or 3D wireframe as an input. The wireframe comes into this step as a set of connected points forming a set of closed polygons shown as roof 10 in FIG. 1B. From this set of points, some basic geometric flaws are identified and corrected.

At 104, the process derives metadata from the original wireframe. A series of analysis steps are made to derive contextual information that becomes metadata for the wireframe. Each step of the analysis yields an additional layer of metadata derived from the wireframe and previous layers of derived metadata. This combined set of metadata provides valuable context for later processing steps.

At 106, the process performs in-plane normalization which takes as input a "rough" wireframe (2D or 3D) generated by a manual or automated process and then performs an 'in-plane' normalization of the wireframe to yield a new wireframe. Any elevation or 'z' coordinate values of the input wireframe are ignored during this normalization step. Therefore, while this step is typically processes 2D wireframes, it remains compatible with a wireframe input that already contains elevation data.

At 108, extrusion into a "rough" 3D wireframe is performed by transforming output of the in-plane normalization of step 106 to a "rough" 3D wireframe suitable for import into a subsequent 3D wireframe correction algorithm. Extrusion of a normalized 2D or 3D wireframe is performed to produce a "rough" 3D form using a set of rules combined with metadata that the algorithm derived from the original wireframe in step 104.

At 110, correction of a 3D wireframe is performed. For example the correction step may take as an input the "rough" 3D wireframe generated by the output of the step 108, or directly from prior art Method 3 or any similar manual or automated method yielding a 3D wireframe. A new wireframe model is generated by correcting the original wireframe to satisfy a set of user-defined constraints and to remove geometric distortions/problems found in the original wireframe that are inconsistent with the selected constraints. This includes systematic processing of primitives, facet polygons, and line segments, which may be continued throughout the wireframe until the corrections converge to a final roof shape with no further changes.

Figure 1B:
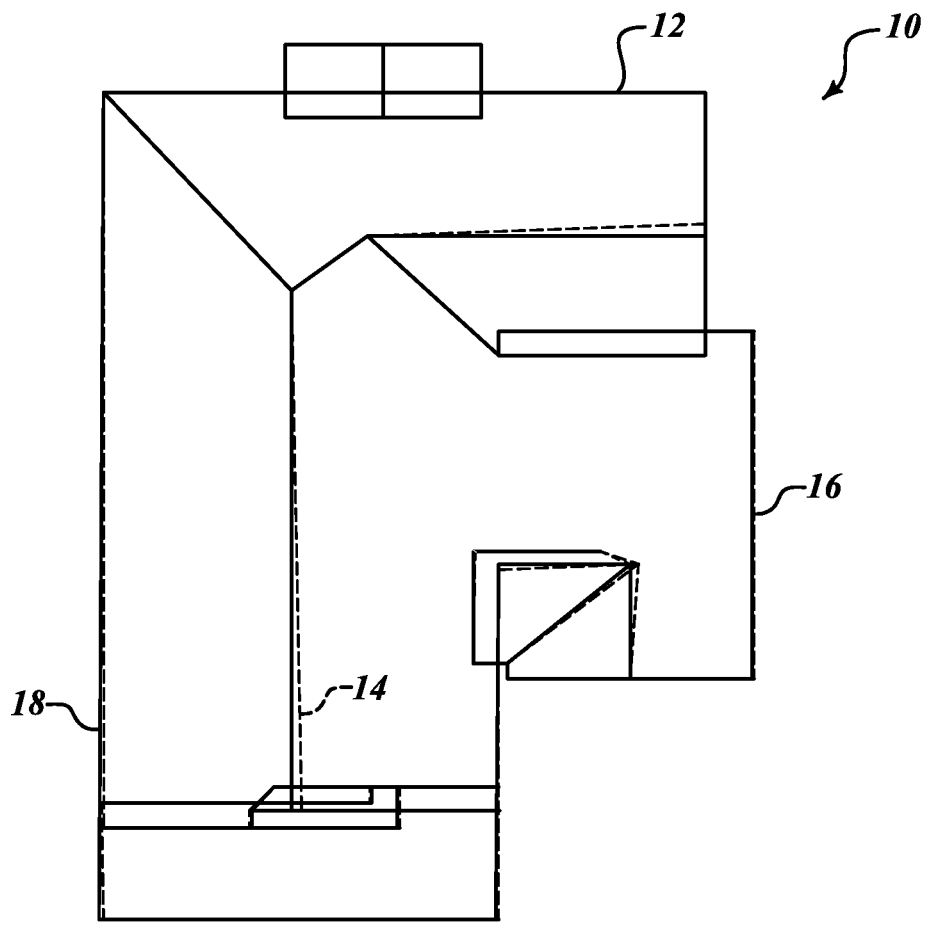
FIG. 1B shows a top side 2D view of wireframe correction according to one embodiment of the present invention.

FIG. 1B shows a wireframe rectification of a 2D image of a roof. In particular, FIG. 1B illustrates a roof 10 shown as a 2D top plan view. This is the type of view that would be seen looking down on the top side of a roof from an overhead image. This view can be obtained from an aircraft that flies over the roof 10 and takes a picture using standard photographic equipment.

A number of potential difficulties arise when a photograph is taken from a top side view of a home of the type shown in FIG. 1B. A first difficulty is that the camera mounted on the aircraft, satellite, or other aerial platform might not be directly over the roof 10 at the moment that the photograph is taken. If the camera is directly overhead, then an exact top plan view of the roof 10 is provided in the image which is created in the photograph. However, if the camera is off to one side, for example several degrees to the left or right of directly overhead, then the relative position of objects of different elevations (height) within the image of the roof 10 will appear to be shifted when compared to a truly top-down viewpoint. In some cases, presence of this 'lean' in the image can be observed as the ability to see the side of a vertical wall or chimney. It is difficult to correct for the amount of lean unless it is exactly known. In addition, the presence of lean may affect the perception of objects in the image differently depending on the pitch of the various roof faces and the orientation of the roof 10 with respect to the aircraft at the time the photograph was taken. A further problem is that the original images typically undergo a series of processing steps such as compression, resampling, and orthorectification before image is published into an image library. This processing may degrade details and/or introduce geometric distortions that were not present in the original image. Yet a third problem of the top side photograph is the difficulty in determining the pitch of the roof. The pitch is a measure of the slope of a roof facet. Typically, pitch is defined as the ratio change in height (in inches) for every 12 inches of of lateral movement in the direction of steepest descent. This may be reported as a ratio of 6/12 or simple as 6 with an implied denominator of 12 inches. A roof pitch of 0/12 represents a flat roof while a 9/12 pitch denotes a steeper slope than a 6/12 roof pitch. From a single top-side-only photograph, determining the exact pitch is difficult and often not possible. Accordingly, the image of the roof 10 is rectified according to principles of the present invention as set forth herein.

Wireframe Rectification

FIG. 1B shows wireframe rectification being performed. This is a pre-cursor step that can optionally be used within or as a precursor to each of the other four processing algorithms that follow. The algorithm can work with either a 2D or 3D wireframe as an input.

The wireframe comes into this algorithm as a set of connected points forming a set of closed polygons shown as roof 10 in FIG. 1B.

From this set of points, a series of processing steps are to identify and correct some basic geometric flaws.

These steps may include:

a) Orientation/Rotation: Principal axes of the wireframe are determined to gain an understanding of the orientation of the structure represented by the wireframe. This orientation information can then be used to rotate the coordinate system of the wireframe to any desired orientation.

b) De-skew: The wireframe is analyzed to determine if a global 'skew' is present, namely, if the two principal axes of the structure are not orthogonal to each other. This type of distortion makes rectangular objects look like parallelograms. If detected, the set of points are transformed to move the lines to become orthogonal and thus remove the skew.

c) Rectify: Points in the wireframe are shifted in the plane as needed to straighten lines, square off corners, and adjust lines to be either parallel or perpendicular to other lines based on a set of rules using information regarding their proximity to each other, the relation of each major line, and their nearest neighbors. For example, according to one set of rules, long extending edges of the roof 10 on opposite sides are made parallel to each other while corners between connect lines that are very close to 90° are made to be exactly 90° square.

As can be seen in FIG. 1B, the solid dark lines indicated by line 12 is one example of the fully corrected final lines of the roof, while the dashed lines 14 represent the position of the line in the original image. The rectified, solid line wireframe has been overlaid on top of the original photograph of wireframe 14 to better illustrate the corrections which have been made and the realignment to each of the lines. As can be seen, the line 12 did not require any changes from the photograph because it was properly aligned, however one more lines 14 required a deskew in order to align the principle axes of the structure with each other. In addition, some alignment was required of the two sides 16 and 18 to ensure that they were parallel with respect to each other. Other appropriate orientation and rotation was carried out in order to properly represent the roof 10 to obtain the rectified solid line pattern overlaid on the original dashed line pattern shown in FIG. 1B.

Derivation of Metadata from the Original Wireframe

FIG. 2 shows another pre-cursor step that can be made prior to each of the processing algorithms that follow. The wireframe of the roof 10 is input to this algorithm as a set of connected points forming a set of closed polygons. The algorithm is equally applicable to whether the original wireframe is flat 2D representation of the roof or a 3D representation of the roof.

From this set of connected points, a series of analysis steps are made to derive contextual information that becomes metadata for the wireframe. Each step of the analysis yields an additional layer of metadata derived from the wireframe and previous layers of derived metadata. This combined set of metadata provides valuable context for later processing steps.

Basic metadata includes a catalog of nearest neighbor points, nearest neighbor segments, segment membership in polygons, etc.

This basic metadata is then used to determine more abstract information such as whether segments are edges or ridges, groups of points and/or line segments that will likely reside at the same elevation (Z coordinate) in the final model, and which points look like hip junctions, gable junctions, or corners on the perimeter of the structure, for example.

Additional metadata layers are then derived to identify the presence of common geometric forms, referred to herein as 'primitives,' that are components of many roof architectures. Examples of such 'primitives' include hips and gables. The identification of the primitives facilitates an association of individual roof facets with one or more primitive objects in standard root geometry.

Finally, an ordered hierarchy is established between these roof primitives that provides context regarding the spatial relationships that exist between the primitives. This hierarchy is used to establish an order of operations in later processing steps.

Figure 2A:
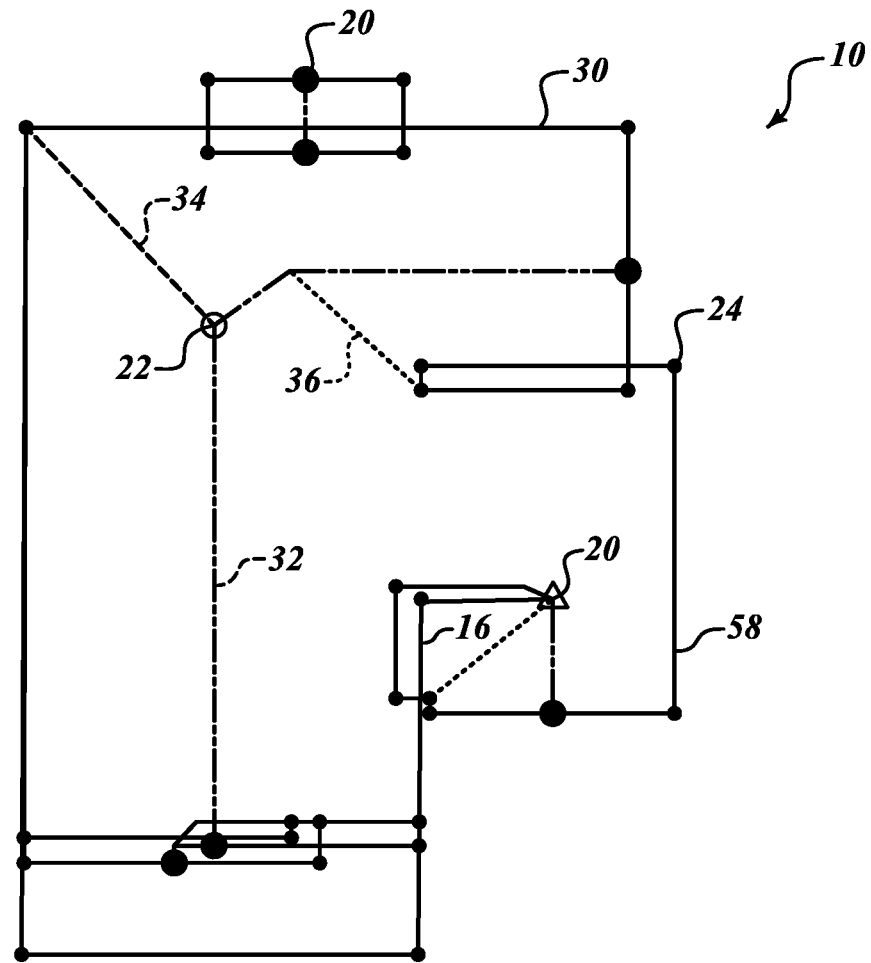
FIG. 2A illustrates a precursor step of deriving metadata from a proposed wireframe according to principles of the present invention.

FIG. 2A shows a first layer of analysis and labeling. The software has analyzed the wireframe and determined some base points and layers of metadata. Shown in this diagram of FIG. 2A are gable origination points 20, large dark circles ●; hip origination points 22, open circles ○; edge segments 30, dark solid line —; ridge segments 33, dash-dot line ▬▬; hip segments 39, dash lines -----; junction and valley segments 36, dotted line ·······;; corner points 24, closed black circles •; and 'complex' intersection points 26, triangles Δ. Of course, the various lines and points can be shown on a computer screen in different colors rather than as different sizes and styles of black to provide ease of use for an operator. For example, the gable origination points can be red, the hip points green or blues and the corner points yellow or black. Similarly, the various lines can be in solid colors, such as red lines for the ridge segments, green lines for the edge segments and magenta or blue or purple for the junction and valley segments. The different metadata are shown here with different black and white representation patterns for the patent application, but in some embodiments, different colors on the computer screen will be preferred.

Figure 2B:
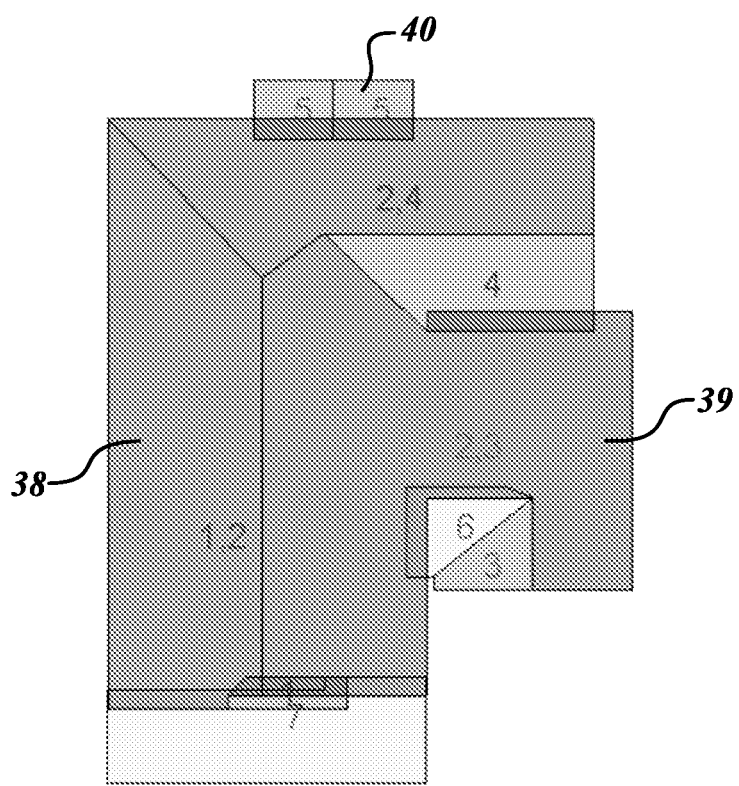
FIG. 2B is a top side view illustrating the membership of various roof facets within geometric primitives identified from the metadata for the roof of FIG. 2A.

In FIG. 2B, the wireframe and metadata from FIG. 2A are further processed to identify hip and gable primitives, as well as uncategorized geometric primitives. Facet polygons labeled with a 2 are members of the hip associated with the hip origination point 22 identified in FIG. 2A. Facets labeled with 1, 3, 4, 5 are members of the respective gable primitives associated with the gable origination points 20 identified in FIG. 2A. Facets labeled with 6 and 7 are identified as geometric primitives that are not hips, gables, or any other common geometric form recognized by the software. As seen in FIG. 2B, the mapping of facet polygons to primitives is a one-to-many relationship—e.g., a facet may be a member of more than one identified primitive. For example, the facet 38 is both a gable primitive 2 and a hip primitive 1, whereas facet 40 is only a gable primitive 5.

Figure 3:
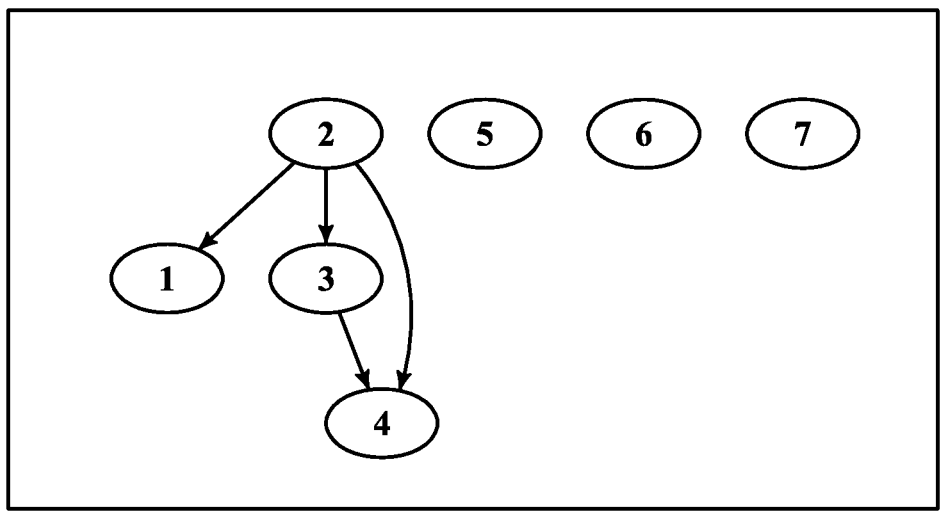
FIG. 3 illustrates the hierarchy operations in deriving the primitives of FIG. 2B.

As shown in FIG. 3, the metadata derived from the wireframe in previous steps represented by FIGS. 2A and 2B is analyzed further to determine hierarchy among the identified primitives. Information from this hierarchy can then be used by other algorithms to establish a preferred order of processing when progressing through the wireframe.

As seen in FIG. 3, the algorithm determined the hierarchy of the connected hip and gable primitives. Primitive 2, the gable on the main ridge line of the entire home, was determined to be higher in the hierarchy than the subordinate (or child) primitives 1, 3, and 4. Multiple parentage is allowed during this process such that Primitive 3 is also identified as parent of Primitive 4. Algorithms consuming this hierarchy may choose to prune multiple parent linkages such that each child only has a one parent.

The uncategorized primitives 5, 6, 7 are shown without parents or children. For 5 and 7, this is due to the fact that the underlying polygons are physically disconnected from the main portion of the wireframe containing 1, 2, 3, 4. Primitive 6 is also shown as disconnected in the hierarchy even through it shares a line segment with the wireframe containing 1, 2, 3, 4. In this case, the software determined that pruning this primitive from the main hierarchy would result in a better order of operations for down-stream processing. In other situations, the algorithm may have joined Primitive 6 to the main hierarchy as a child of 2 and 3.

The algorithm for the selection of hierarchy is based on a set of rules that evaluates the intersections between the identified primitives. These rules normally produce a hierarchy predicting a top-down elevation ordering of connected primitives. In this case, primitives 2 (associated with ridgeline 32) is ranked above the primitives 1, 3, and 4. This ranking is consistent with relative elevations of the ridgelines observed in FIG. 5 resulting from additional downstream processing steps.

In-Plane Normalization

Figure 4:
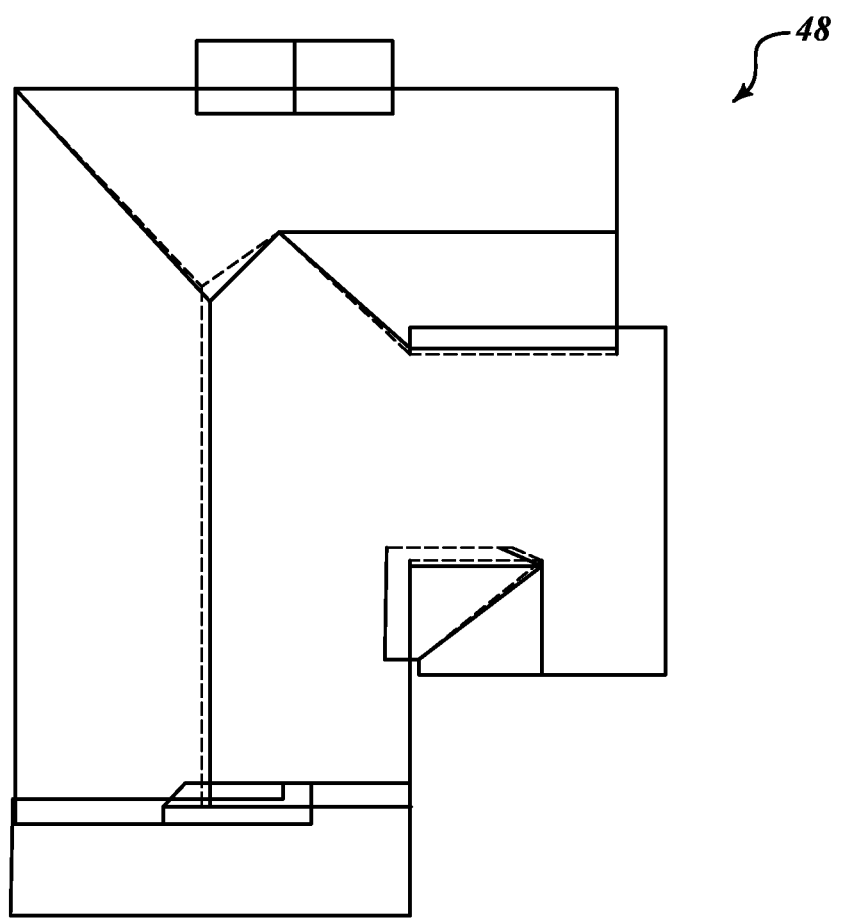
FIG. 4 illustrates the correction of a "rough" 3D wireframe from a normalized 2D wireframe using rules from the metadata.

FIG. 4 shows in-plane normalization in which the algorithm takes as input a "rough" wireframe (2D or 3D) generated by the first technique of FIG. 1B or by a manual process similar to Method 1 of the prior art, or by an automated process employing computer vision techniques, or by some other free-hand method that may or may not employ a photograph as a background image during the tracing process (e.g., a hand-drawn sketch for example).

The algorithm then performs an 'in-plane' normalization of the wireframe to yield a new wireframe. As the name suggests, this algorithm ignores any elevation or 'z' coordinate values of the input wireframe during this normalization step.

Therefore, while this algorithm is typically used to process 2D wireframes, it remains compatible with a wireframe input that already contains elevation data.

A top-down view of the normalized result 48 shows a wireframe that has been corrected for lean effects and many other geometric distortions and imperfections that may be present in an original wireframe. Although the elevation values of the points within this wireframe may not have been adjusted yet, the shapes of the polygons have been modified to yield a true top-down viewpoint for each facet that is consistent with a set of initial pitch values assigned to the roof facets. In another embodiment, a precursor step to the In-Plane Normalization may have made adjustments/corrections to the 'z' coordinate values (elevation values) of the points.

One great value of the removal of the lean and other distortions is realized when this normalized model is used as an input to the Extrusion and 3D-correction algorithms discussed later in this document. The errors associated with those lean artifacts and edge distortions would otherwise become amplified during the subsequent extrusion and correction steps and degrade the quality of the end result.

When the algorithms of the invention are used in this sequence, the speed and ease of use of prior art Method 1 provides a precursor model that can be further processed to yield a model that is equivalent in quality and accuracy to the output of prior art Method 3.

This algorithm provides several competitive benefits:

a) Significant reduction of manual drawing time, which was the primary benefit of prior art Method 1.

b) Minimal technician training time, another primary benefit of prior art Method 1.

c) Maintains all the benefits of prior art Method 3—accuracy, consistent geometry, and no dependence on previous pitch knowledge.

d) Maintains compatibility with existing construction methods.

e) Supports and enhances models derived from automated computer vision methods.

Following are the in-plane normalization algorithm details:

a) Precursor steps: Wireframe metadata has been determined and the structure has been processed by the rectification algorithm as set forth in FIGS. 1B-3. The use of either or both of these techniques as a precursor step is preferred but not required.

b) Seeding of Pitch Values: An initial set of pitch values and orientations are assigned to each roof facet. The assignment could be via user assignment, by an algorithm that assigns a pitch based on metadata derived from the 2D or 3D wireframe, or by an algorithm that gleans pitch information from the existing "rough" 3D wireframe provided as an input.

c) Adjustment of ridgelines: A systematic pass is made through the wireframe to adjust the lateral position of the points associated with line segments identified as 'ridges'. The adjustments are made to accommodate pitch values associated with the polygons that share the ridge segment and/or the ridge segment's endpoints.

d) Correction of Junctions between Primitives: Line segments that have been identified as junctions or seams between adjacent primitives are likewise adjusted to accommodate the specified pitches and the adjusted positions of the ridgelines. An iterative loop repeats steps (c) and (d) until the repositioning of lines and points converges to a stable state. In an alternative embodiment, the loop repeats steps (b), (c), and (d) allowing flexibility in adapting the pitch of facets when converging to the final solution.

FIG. 4 shows the result 48 of the In-Plane Normalization, shown by the solid lines in FIG. 4, that is overlaid on the rectified wireframe of FIG. 1B, which is shown by the dashed lines of FIG. 4.

The shift of the line positions resulted from a repositioning of the hip and gable origination points 20 and 22 and junction line segments 32 to accommodate a set of pitch values that were assigned to each of the facets. This adjusts for lean and rotation that may have been present in the first image. In this example, the corrections have been made based on an assigned pitch of 7/12 for all facets except for the facet associated with primitive 6, which has been assigned a pitch of 9/12.

Extrusion into a "Rough" 3D Wireframe

Figure 5:
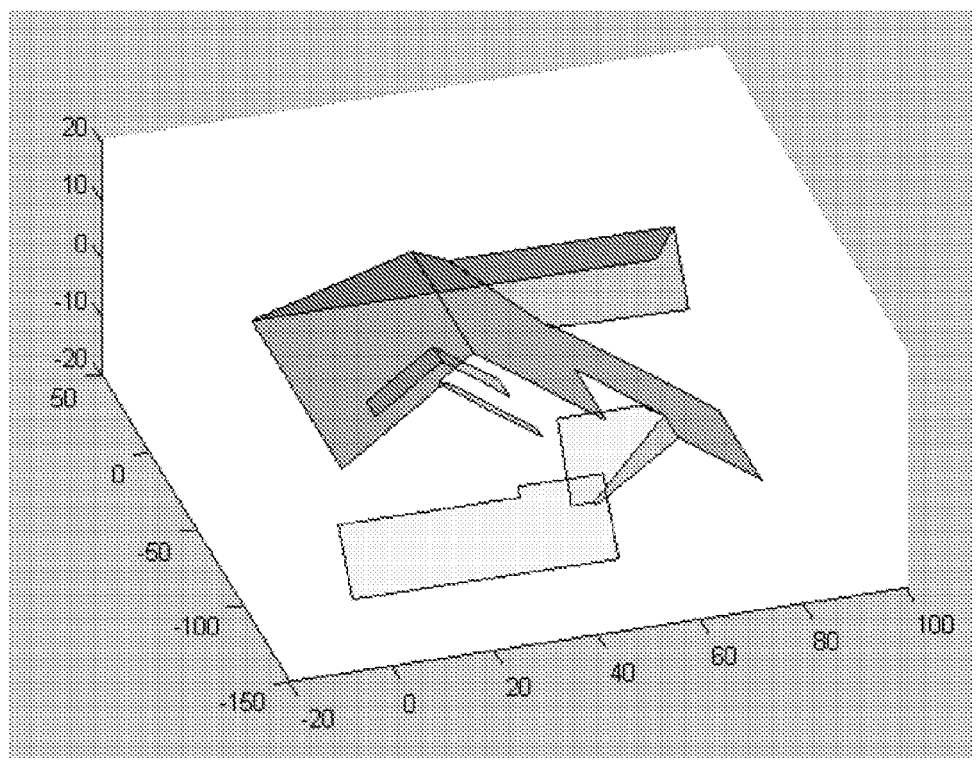
FIG. 5 illustrates a 3D wireframe model of the roof of FIG. 2A according to one embodiment.

FIG. 5 shows the results of an algorithm as a transition step that transforms output of the in-plane normalization to a "rough" 3D wireframe suitable for import into a subsequent 3D wireframe correction algorithm.

This algorithm performs an extrusion of a normalized 2D or 3D wireframe to produce a "rough" 3D form using a set of rules combined with metadata that the algorithm derived from the original wireframe in FIGS. 2A and 2B and 4, for example.

The resulting "rough" 3D model may contain some geometric inconsistencies that were not anticipated or corrected during the in-plane normalization step or during the extrusion step.

The "rough" 3D model is then used as an input into the aforementioned 3D correction algorithm for further processing.

Extrusion algorithm details:

a) Precursor steps: Wireframe metadata has been determined and pitch values have been assigned to each of the facets. The structure has optionally been processed by the rectification algorithm and/or optionally has undergone an in-plane normalization step.

b) Extrusion of the wireframe into 3D: A systematic pass is made through the extruded wireframe to correct the locations of points in the wireframe to accommodate the desired pitches and facet orientations. Information from the primitive hierarchy provides context for the order of primitive processing. Combined with other derived metadata, the primitive hierarchy also provides contextual clues about the relative elevations between groups connected by primitives. If the input wireframe is already in a "rough" 3D form, elevation information from this model may optionally be used by the Extrusion algorithm to "seed" initial relative elevations of points, lines and/or primitives with respect to other points, lines, and/or primitives present in the mode. If the input wireframe is 2D, it does not contain elevation information. In such a case, metadata containing hints about relative elevations between objects in the model (such as a disconnected patio or bay window cover) can be used to provide context for placing some objects above or below others in the extruded 3D output.

As shown in FIG. 5, the in-plane optimized wireframe of FIG. 3 has been extruded into a "rough" 3D wireframe.

Correction of 3D Wireframes

Figure 6:
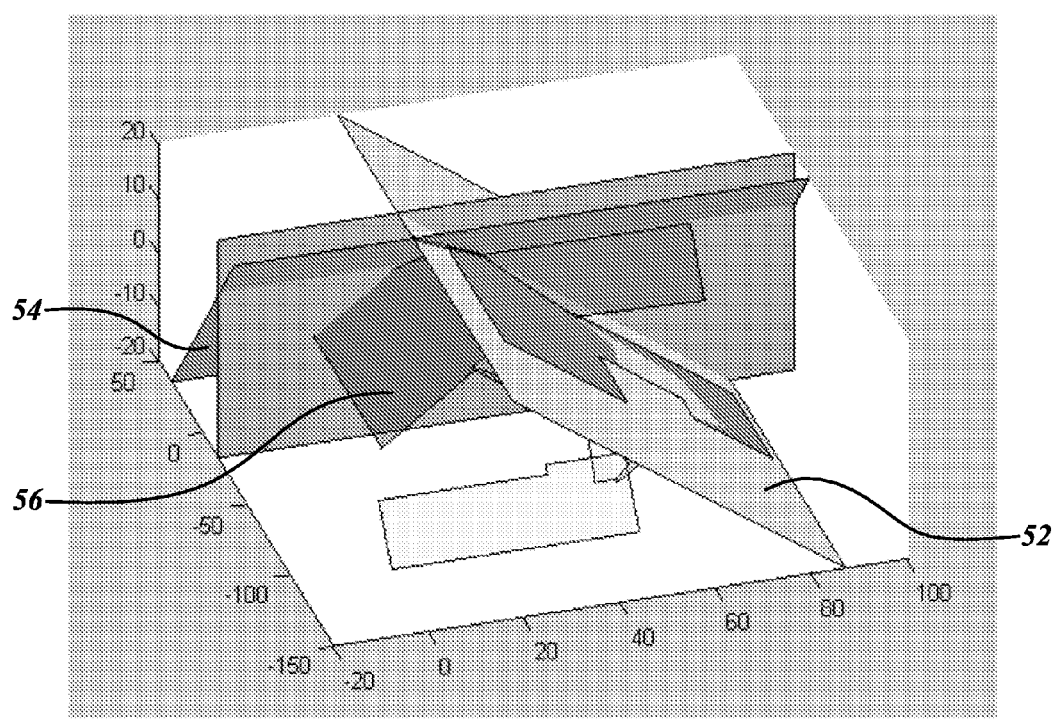
FIG. 6 illustrates a plurality of geometrical objects representing the state of the correction algorithm during the process of correcting the spatial location of a point in the wireframe model of FIG. 5.

FIG. 6 shows algorithm that takes as an input the "rough" 3D wireframe generated by the output of the 'Extrusion' algorithm of FIG. 5, or directly from prior art Method 3 or any similar manual or automated method yielding a 3D wireframe.

The algorithm then generates a new wireframe model by correcting the original wireframe to satisfy a set of user-defined constraints and to remove geometric distortions/problems found in the original wireframe that are inconsistent with the selected constraints. As can be seen in FIG. 6, whole planes of the proper geometric shape are overlaid in an interest to assist in correction of prior possible error.

For example, an original wireframe originating from Method 3 may contain some erroneously shaped roof polygons due to errors made by an inexperienced technician or even by a highly experienced technician that can quickly create a "rough" model that may contain a series of small correctible defects. In another example, an automated computer vision process produces a wireframe that contains correctable defects resulting from the small statistical uncertainties in its ability to determine the exact location of poorly resolved boundaries. In a third example, the output from the 'Extrusion' algorithm of FIG. 5 may contain defects resulting from complex intersection from several planes which require further normalization to correctly resolve.

In these situations, the correction algorithms process the "rough" input wireframe to yield a wireframe that is consistent with a set of selected constraints. Examples of such constraint may include:

Preserving the footprint (e.g., perimeter) of the original wireframe

Correcting angles of intersection between line segments

Straightening line segments

Specifying a particular pitch for one or more facets

Allowing the pitch of one or more facets to conform with other constraints

Enforcing relationships between line segments and facets to satisfy symmetry requirements.

Correcting of 'lean' artifacts that are identified in the original model

Additional constraints that have proved to be useful may include:

Constraining groups of points and/or line segments to reside at the same elevation (elevation groups). For example, such line segments include the line segments (and points they contain) that are parallel and equidistant from a ridge line as measured by the perpendicular distance between the ridge and the line segments. See the two line segments 58 and 60, which meet these criteria for the ridge 20 in FIG. 2A.

Constraining two or more elevation groups to maintain a particular difference in elevation. For example, Group 1 is the ridge 20 in FIG. 2A. Group 2 are the line segments identified in the above example of an elevation group.

Enforcing symmetry between nearly symmetric objects in the model, such as between the left and right planes 5 in FIG. 2B.

The constraints above are additional examples of the use of metadata derived from the input model and/or collected interactively from the user. Also, the constraints above may be followed according to an assigned priority. For example, if one constraint cannot be adhered to without violating another constraint, the constraint to adhere to may be decided based upon which constraint has a higher priority. The priorities may be assigned by a user to be followed automatically during the processes described herein or created dynamically during the process of 3D wireframe generation. The metadata used in the examples above derived from the input model and/or collected interactively from the user may also or instead be used in the process for extrusion into a "rough" 3D wireframe described above.

This algorithm provides several competitive benefits:

a) It automates small corrections that would otherwise require manual correction by quality control staff that review the work of other technicians.

b) It decrease the time spent drawing a 3D wireframe using manual processes. Technicians can be less precise when "roughing" out a 3D model. This time savings increases with the complexity of the roof model.

c) It reduces some skill and training time required for new technicians d) It processes constraints specified to produce models that satisfy a set of conditions required by third party CAD applications that desire to import the model for further editing.

e) It provides mechanisms to "clean up" or adjust models generated from other processes or programs.

Some software used by insurance claim adjustments has a set of constraints for their CAD software that renders roof images. Some software tools have a specific set of requirements that must be satisfied in order to import a roof diagram into their CAD software tool. The ability to modify a model derived from a photograph image to conform to the software requirements of specific CAD software tools is provided by the features of this invention. This yields the advantage of compatibility across the industry, one of the benefits of the inventive techniques described herein. In some embodiments, the modification includes modifying the shape of the roof facets of the wireframe model including comparing the roof facets of the wireframe model to geometric shape primitives stored in a database of roof geometric shape primitives, and modifying the shape of at least one of the roof facets of the wireframe model to match the geometric shape of a previously stored primitive.

3D Correction Algorithm Details:

a) Precursor steps: Wireframe metadata has been determined and pitch values been assigned to facets. The pitch value assignment could be via user assignment, by an algorithm that automatically assigns a pitch based on metadata derived from the 2D or 3D wireframe, or by an algorithm that derives or assesses pitch information from the existing "rough" 3D wireframe provided as an input. The structure has optionally been processed by the rectification algorithm and/or optionally has undergone an in-plane normalization step and/or has optionally undergone an extrusion step.

b) Assembly: The "rough" wireframe input and the associated metadata provide a prototype from which a new wireframe is assembled while enforcing a set of constraints on the wireframe. These constraints may include such things as: i) A requirement that the set of points in each identified roof facet are coplanar to within a specified tolerance. ii) The area footprint in the XY plane of the wireframe's perimeter remains within a specified tolerance of the original "rough" wireframe's footprint area. iii) ridgelines and eavelines remain parallel to the XY plane.

FIG. 6 is a "rough" wireframe of the 3D frame shown in FIG. 4 overlayed with several known geometric objects. This figure illustrates a snapshot of the processing being performed to correct the spatial location of one point within the "rough" 3D form of the wireframe. The large plane 52 highlights the facet polygon 39 from FIG. 2B currently being corrected. The plane 54 highlights the adjoining planar facet sharing the currently processed line segment with the main plane 52. The line segment in this example originates from the ridgeline of Primitive 2 and terminates at the ridgeline of Primitive 4. The darker plane 56 is a plane orthogonal to the XY plane that intersects the ridgeline of Primitive 4. The coordinates of the terminal endpoint of his line segment are then calculated as the intersection of the plane 56 with the line segment computed from the intersection of the planes 54 and 52, respectively. In FIG. 5, the various planes and geometric shapes are shown in different shades of gray; of course, on a computer screen, each of the geometric shapes or planes may be a different color to provide highlight for a user. For example, the plane 52 may be green, the plane 54 red, the polygon 39 blue and the darker plane 56 a brown or orange. This diagram serves to illustrate one of many similar internal processing steps that are not typically displayed to the end user because they typically do not require user input. The systematic processing of primitives, facet polygons, and line segments is continued throughout the wireframe until the corrections converge to a final roof shape with no further changes. If convergence does not occur, the software may exit or produce a corresponding message or alert due to a non-convergence condition.

Typical Usage Scenarios:

In the "background" section of this document, three prior art methods were identified and discussed as the motivation for inventing new methods that leverage best efficiency and accuracy attributes of the present methods.

Various new technology components, such as, for example, those listed below as items 1-5 resulted from this effort:

1) Wireframe rectification
2) Derivation of metadata from the original wireframe
3) In-plane normalization
4) Extrusion into a "rough" 3D wireframe
5) Correction of a 3D wireframe Although the above technology components can be used independently, there are a number of usage embodiments envisioned involving these various technology components in various scenarios. The following labels for each step in each scenario below are for ease of identification and recollection of common steps within the various scenarios for the sake of brevity and do not limit the content or activities in each step.

Scenario 1

In scenario 1 below, the output is a corrected 3D wireframe.

a) "Wireframe": A 2D or 3D wireframe is used as input along with (optional) registration information that enables the system to overlay, project, and/or map the points of the input 2D or 3D wire frame onto one or more photographs containing an image of the structure of interest.

b) "Rectify": Wireframe Rectification is optionally applied to the input 2D or 3D wire frame.

c) "Metadata": Metadata is derived from the input 2D or 3D wire frame and/or the output of (b).

d) "AssignPitch": Pitches are either assigned by algorithms that analyze neighboring polygons to infer relative pitch values or the pitches are assigned by the user.

e) "Normalize": The in-plane normalization algorithm is applied to the wireframe.

f) "Extrude": The Extrusion algorithm is applied.

g) "Correct 3D": The 3D correction algorithm is applied.

h) "Verify":

The following are example steps takes during the "Verify" process:

1. Validation: As assessment of the resulting wireframe is made to determine if the wireframe conforms to the above mentioned pitches and constraints to within a desired tolerance. If the model does not conform, the algorithm to returns to (d) or (e) until the wireframe is successfully validated or the algorithm determines that insufficient progress is being made toward converging to a valid model.

The following steps h(2) and h(3) may be optional since they depend on the result of the image registration process and could be omitted if the registration information is not provided as part of the input.

2. Projection: The validated wireframe is transformed and projected onto each of the photographs registered into the coordinate system determined provided in (a), as described in U.S. patent application Ser. Nos. 12/467,244 and 12/467,250.

3. Quality of Fit evaluation (shown in FIGS. 8A and 8B): The projected wireframes are evaluated for a quality of fit. This may be a combination of an automated quality of fit determination as well as a subjective visual assessment by a quality control technician. If quality of fit is not acceptable, the algorithm returns to step (b) following adjustments to the facet pitch values and/or edits to the wireframe.

Figure 7:
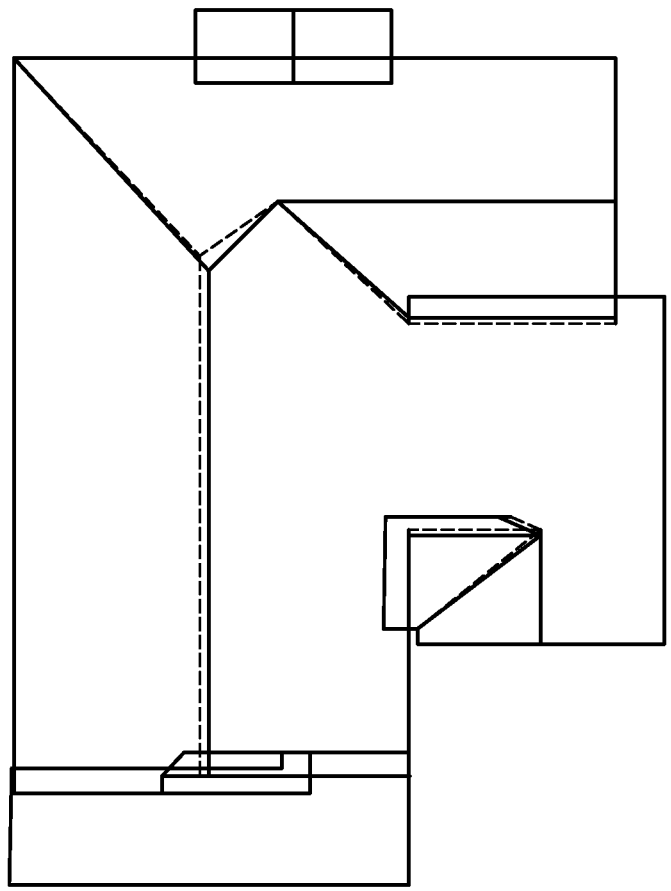
FIG. 7 shows a fully normalized and corrected 2D wireframe model.

FIG. 7 shows the noncorrected 3D wireframe dark lines, overlaid onto the rectified wireframe of FIG. 1B, shown by the dashed lines of FIG. 7. Note that the top-down view of this final 3D wireframe in FIG. 7 is not distinguishable from the output of the (2D) in-plane optimized wireframe in FIG. 4. This is a desirable result for this simple roof example since it illustrates how the in-plane normalization produced a wireframe that correctly represented a top-down projection of what became the final 3D form. In situations of greater wireframe complexity, the correction in 3D may result in a repositioning of lines in the top-down projection that could not be predicted by the in-plane calculations.

Scenario 2

In scenario 2, the output is a corrected 2D wire frame instead of a 3D wire frame as in scenario 1 above. The sequence of steps is: "Wireframe", "Rectify", "Metadata", "Assign Pitch", and "Normalize". The steps of scenario 2 correspond to those steps of scenario 1 having the same labels.

Scenario 3

In scenario 3, the output is a corrected 3D wire frame. Scenario 3 uses a "rough" 3D model input needing minor corrections, such as a model that was already extruded by using the new registration algorithm mentioned in this document above. The sequence of steps is: "Wireframe", "Rectify", "Metadata", "Assign Pitch", "Normalize", "Extrude", "Correct3D", and "Verify". The steps of scenario 3 correspond to those steps of scenario 1 having the same labels. However, in the "AssignPitch" step of scenario 3, pitches are typically assigned by algorithms that generate a "rough" 3D wireframe. Also, the "Extrude" step of scenario 3 leverages existing elevation information to "seed" elevation placements of model points and/or lines, etc.

Scenario 4

Scenario 4 uses a "rough" 3D model input needing major corrections, such as a major pitch correction or after adding, removing, and/or changing major parts of the model. The sequence of steps is: "Wireframe", "Rectify", "Metadata", "Assign Pitch", "Normalize", "Extrude", "Correct3D", and "Verify". The steps of scenario 4 correspond to those steps of scenario 1 having the same labels. However, in the "AssignPitch" step of scenario 4, pitches are typically assigned by algorithms that that generate a "rough" 3D wireframe and/or are overridden by a user. Also, the "Extrude" step of scenario 4 may ignore existing elevation "seed" information where needed to complete a successful extrusion.

Figure 8A:
FIGS. 8A and 8B illustrate the finalized 3D wireframe model superimposed back onto the photograph of the original home.
Figure 8B:

FIGS. 8A and 8B shows the 3D wireframe of FIG. 7 transformed and then projected back on the original source images. Note that the transformation process slightly distorts the appearance of overlayed wireframe to account for the 'lean' and other artifacts that were calculated to be in the original source photographs during the registration process. These distortions are most obvious at the gables of Primitive 1 and 3.

By mapping the distortions back into the wireframe, a quality of fit (QOF) metric can be applied to judge the alignment of the wireframe against the object(s) it represents in the original source image.

In one embodiment a wireframe is generated via prior art Method 2 or 3, then correction is done in 3D as shown in FIGS. 5-7.

This is an extension of Methods 2 and 3 whereby a "rough" 3D model resulting from a manual or automated wireframe generating process is optimized to a desired set of pitch and orientation constraints.

In yet another embodiment, the system will generate a metadata and a rectified 2D model, then normalize in-plane to achieve a final 2D or 3D wireframe.

In some situations, the content of the photograph(s) are insufficient to complete a 3D model without previous knowledge of the pitches of some or all of the roof facets. Furthermore, it may be preferable in some situations to defer the final application of pitch values to selection by an operator at a later time. In such situations, only steps 1, 2, and 3 as set forth under the heading of "Typical Usage Scenarios" above are carried out or, alternatively, step 3 is carried out on the in-plane normalized wireframe traced via prior art Method 1.

Figure 9:
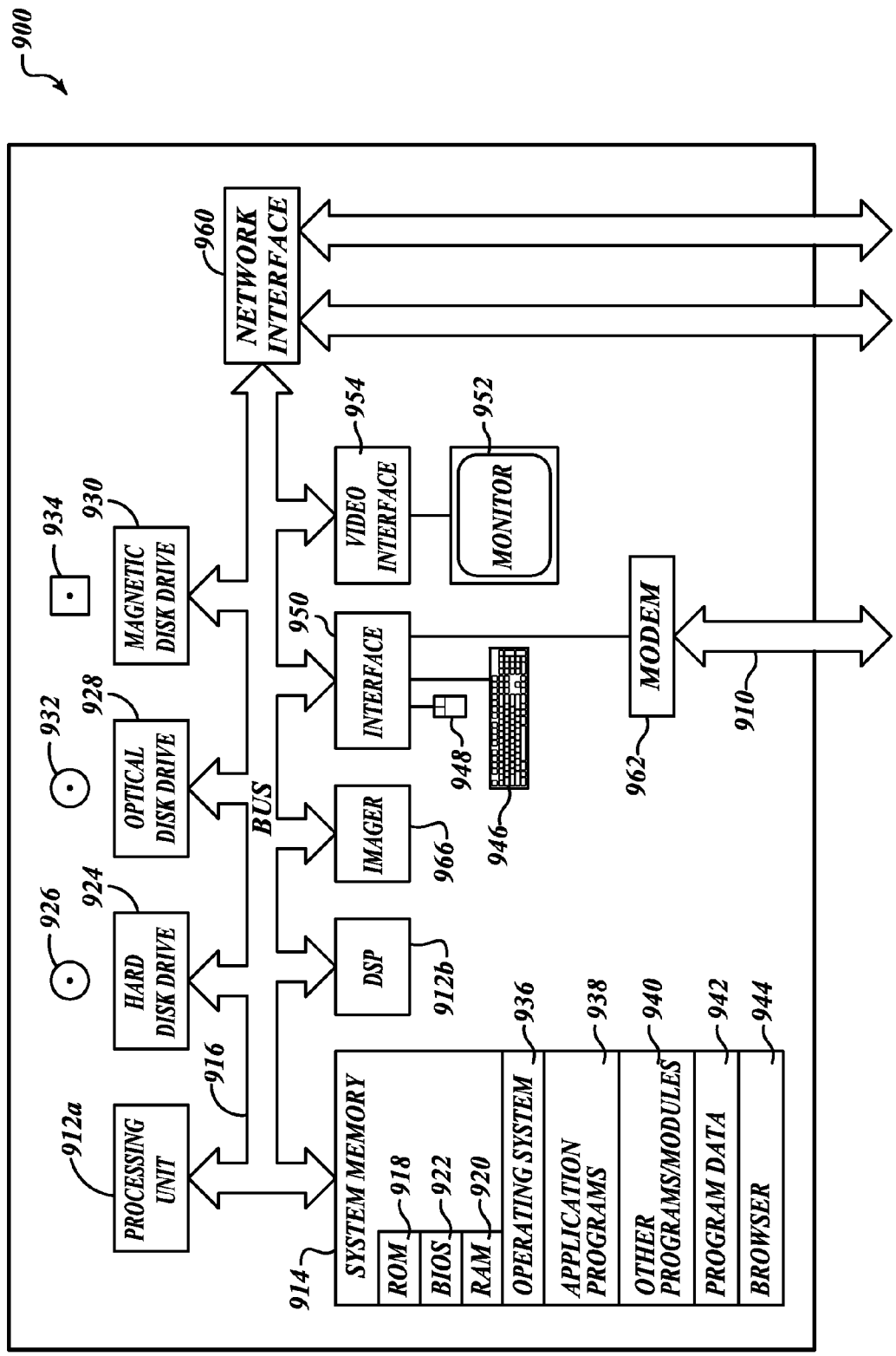
FIG. 9 is a schematic diagram of a computing environment in which geometric correction of rough wireframe models derived from photographs may be implemented or of which it may be a part.

FIG. 9 is a schematic diagram of computing environment in which geometric correction of rough wireframe models derived from photographs may be implemented or of which it may be a part. For example, process 100 described above in conjunction with FIG. 1A may be performed or implemented by, for example, one or more software modules or components or any combination of suitable hardware, firmware or software components or devices including those that are a part of, stored in, or configure the computing environment of FIG. 9.

The computing environment 900 will at times be referred to in the singular herein, but this is not intended to limit the embodiments to a single device since in typical embodiments there may be more than one computer system or device involved. Unless described otherwise, the construction and operation of the various blocks shown in FIG. 9 are of conventional design. As a result, such blocks need not be described in further detail herein, as they will be understood by those skilled in the relevant art.

The computing environment 900 may include one or more processing units 912a, 912b (collectively 912), a system memory 914 and a system bus 916 that couples various system components including the system memory 914 to the processing units 912. The processing units 912 may be any logic processing unit, such as one or more central processing units (CPUs) 912a, digital signal processors (DSPs) 912b, digital video or audio processing units such as coder-decoders (codecs) or compression-decompression units, application-specific integrated circuits (ASICs), field programmable gate arrays (FPGAs), etc. The system bus 916 can employ any known bus structures or architectures, including a memory bus with memory controller, a peripheral bus, and a local bus. The system memory 914 includes read-only memory ("ROM") 918 and random access memory ("RAM") 920. A basic input/output system ("BIOS") 922, which can form part of the ROM 918, contains basic routines that help transfer information between elements within the computing environment 900, such as during start-up.

The computing environment 900 may include a hard disk drive 924 for reading from and writing to a hard disk 926 (including a solid state memory device), an optical disk drive 928 for reading from and writing to removable optical disks 932, and/or a magnetic disk drive 930 for reading from and writing to magnetic disks 934. The optical disk 932 can be a CD-ROM, while the magnetic disk 934 can be a magnetic floppy disk or diskette. The hard disk drive 924, optical disk drive 928 and magnetic disk drive 930 may communicate with the processing unit 912 via the system bus 916. The hard disk drive 924, optical disk drive 928 and magnetic disk drive 930 may include interfaces or controllers (not shown) coupled between such drives and the system bus 916, as is known by those skilled in the relevant art. The drives 924, 928 and 930, and their associated computer-readable storage media 926, 932, 934, may provide nonvolatile and non-transitory storage of computer readable instructions, data structures, program modules and other data for the computing environment 900. Although the depicted computing environment 900 is illustrated employing a hard disk 924, optical disk 928 and magnetic disk 930, those skilled in the relevant art will appreciate that other types of computer-readable storage media that can store data accessible by a computer may be employed, such as magnetic cassettes, flash memory, digital video disks ("DVD"), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 912*a*.

Program modules can be stored in the system memory 914, such as an operating system 936, one or more application programs 938, other programs or modules 940 and program data 942. Application programs 938 may include instructions that cause the processor(s) 912 to perform directional geometric correction of rough wireframe models derived from photographs, and store and display input images or images generated by geometric correction of rough wireframe models. Other program modules 940 may include instructions for handling security such as password or other access protection and communications encryption. The system memory 914 may also include communications programs, for example, a Web client or browser 944 for permitting the computing environment 900 to access and exchange data including digital images of structures with sources such as Web sites of the Internet, corporate intranets, extranets, or other networks and devices, as well as other server applications on server computing systems. The browser 944 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft of Redmond, Wash.

While shown in FIG. 9 as being stored in the system memory 914, the operating system 936, application programs 938, other programs/modules 940, program data 942 and browser 944 can be stored on the hard disk 926 of the hard disk drive 924, the optical disk 932 of the optical disk drive 928 and/or the magnetic disk 934 of the magnetic disk drive 930.

An operator can enter commands and information into the computing environment 900 through input devices such as a touch screen or keyboard 946 and/or a pointing device such as a mouse 948, and/or via a graphical user interface in order to receive, process, store and send data on which geometric correction of rough wireframe models derived from photographs has been or will be performed as described herein. Other input devices can include a microphone, joystick, game pad, tablet, scanner, etc. These and other input devices are connected to one or more of the processing units 912 through an interface 950 such as a serial port interface that couples to the system bus 916, although other interfaces such as a parallel port, a game port or a wireless interface or a universal serial bus ("USB") can be used. A monitor 952 or other display device is coupled to the system bus 916 via a video interface 954, such as a video adapter which may be configured to display images used by or generated by geometric correction of rough wireframe models derived from photographs. The computing environment 900 can include other output devices, such as speakers, printers, etc.

The computing environment 900 can operate in a networked environment using logical connections to one or more remote computers and/or devices. For example, the computing environment 900 can operate in a networked environment using logical connections to one or more other computing systems, mobile devices and other service providers or information servers that provide the digital images in various format or by other electronic delivery methods. Communications may be via a wired and/or wireless network architecture, for instance wired and wireless enterprise-wide computer networks, intranets, extranets, telecommunications networks, cellular networks, paging networks, and other mobile networks.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
generating metadata from a wireframe model of a roof, the wireframe model having a set of line segments, connecting points, and surrounding roof facets, the metadata including;
contextual information of the set of points of the wireframe model, the contextual information comprising a catalog of nearest neighbor points;
first information identifying one or more of the line segments of the wireframe model as edges or ridges of the roof based on the contextual information; and
second information associating the roof facets of the wireframe model with one or more roof geometric shape primitives that are components of architecture of the roof based on at least one of the contextual information and the identified line segments;
normalizing the wireframe model by adjusting one or more of the line segments identified as ridges and a location of roof junction points of the wireframe model based on the generated metadata;
modifying a shape of the roof facets of the wireframe model; and
outputting a revised wireframe model based on the moved junction points and modified shapes, the revised wireframe model more closely approximating the actual shape of the roof.

2. The method according to claim 1 wherein the modifying the shape of the roof facets of the wireframe model includes:
modifying the shape of at least one of the roof facets of the wireframe model to match the geometric shape of an associated primitive.

3. The method according to claim 1 wherein one of the roof geometric shape primitives is a hip or gable.

4. The method according to claim 1 wherein the modifying the shape of the roof facets of the wireframe model is based on the generated metadata.

5. The method according to claim 1 wherein the wireframe model is a 2D top view of the roof.

6. The method according to claim 5 further including:
generating a 3D wireframe of the roof based on the revised wireframe model.

7. A non-transitory computer readable medium having computer executable instructions thereon that, when executed, cause a computer processor to perform the following:
generating metadata from a wireframe model of a roof, the wireframe model having a set of line segments, roof junction points, and roof facets, the metadata including:
contextual information of the roof junction points of the wireframe model, the contextual information comprising a catalog of nearest neighbor points;
first information identifying one or more of the line segments of the wireframe model as edges or ridges of the roof based on the contextual information; and
second information associating the roof facets of the wireframe model with one or more roof geometric shape primitives that are components of architecture of the roof based on at least one of the contextual information and the identified line segments;
normalizing the wireframe model by adjusting one or more of the line segments identified as ridges and a location of the roof junction points of the wireframe model based on the generated metadata;
modifying a shape of the roof facets of the wireframe model; and
outputting a revised wireframe model based on the moved junction points and modified shapes, the revised wireframe model more closely approximating the actual shape of the roof.

8. The non-transitory computer readable medium of claim 7 wherein the modifying the shape of the roof facets of the wireframe model includes:
modifying the shape of at least one of the roof facets of the wireframe model to match the geometric shape of an associated primitive.

9. The non-transitory computer readable medium of claim 7, wherein the computer executable instructions thereon, when executed, further cause the computer processor to perform generating a 3D wireframe of the roof based on the revised wireframe model.

* * * * *